United States Patent
Kobayashi et al.

(10) Patent No.: US 10,583,475 B2
(45) Date of Patent: Mar. 10, 2020

(54) METHOD FOR MANUFACTURING RING-SHAPED MEMBER AND MANUFACTURING APPARATUS FOR SAME

(71) Applicant: NSK LTD., Tokyo (JP)

(72) Inventors: Kazuto Kobayashi, Kanagawa (JP); Yuu Yasuda, Kanagawa (JP)

(73) Assignee: NSK LTD., Tokyo (JP)

( * ) Notice: Subject to any disclaimer, the term of this patent is extended or adjusted under 35 U.S.C. 154(b) by 317 days.

(21) Appl. No.: 15/505,689

(22) PCT Filed: Aug. 20, 2015

(86) PCT No.: PCT/JP2015/073437
§ 371 (c)(1),
(2) Date: Feb. 22, 2017

(87) PCT Pub. No.: WO2016/027871
PCT Pub. Date: Feb. 25, 2016

(65) Prior Publication Data
US 2017/0274443 A1    Sep. 28, 2017

(30) Foreign Application Priority Data

Aug. 22, 2014  (JP) ................ 2014-169183
Dec. 10, 2014  (JP) ................ 2014-249544
Mar. 10, 2015  (JP) ................ 2015-047234

(51) Int. Cl.
*B21H 1/12*      (2006.01)
*B21B 5/00*      (2006.01)
*F16C 33/00*     (2006.01)

(52) U.S. Cl.
CPC ............. *B21H 1/12* (2013.01); *B21B 5/00* (2013.01); *F16C 33/00* (2013.01);
(Continued)

(58) Field of Classification Search
CPC .... B21H 1/06; B21H 1/12; B21B 5/00; B21D 53/16; F16C 33/00; Y10T 29/49668;
(Continued)

(56) References Cited

U.S. PATENT DOCUMENTS 3,466,912 A * 9/1969 Marcovitch ............ B21H 1/12
                                          72/110
3,498,095 A    3/1970 Marcovitch
(Continued)

FOREIGN PATENT DOCUMENTS

DE    1289019 B    2/1969
JP    40-16898 B1  8/1965
(Continued)

OTHER PUBLICATIONS

International Search Report and Written Opinion dated Oct. 13, 2015, from the corresponding PCT/JP2015/073437.
(Continued)

*Primary Examiner* — Sarang Afzali
(74) *Attorney, Agent, or Firm* — Katten Muchin Rosenman LLP

(57) ABSTRACT

Construction is achieved that, together with preventing the occurrence of damage to a mandrel, is able to improve precision of the shape of a ring-shaped member after processing. A mandrel includes a pair of support shaft sections that are provided so as to be separated in the axial direction and so as to be concentric with each other, and a rolling shaft section that is concentrically provided in the axial direction between the pair of support shaft sections. One of the support shaft sections is provided in a state in which displacement in the axial direction with respect to the rolling shaft section is regulated. The other support shaft section is provided in a state in which displacement in a direction
(Continued)

going away from the rolling shaft section is possible when a pressing force is applied in that direction.

6 Claims, 22 Drawing Sheets

(52) U.S. Cl.
CPC .... *Y10T 29/49668* (2015.01); *Y10T 29/49671* (2015.01); *Y10T 29/49689* (2015.01)

(58) Field of Classification Search
CPC ......... Y10T 29/49671; Y10T 29/49684; Y10T 29/49689
USPC ............................................ 72/105, 106, 111
See application file for complete search history.

(56) References Cited

U.S. PATENT DOCUMENTS

| | | | | |
|---|---|---|---|---|
| 3,626,564 | A | | 12/1971 | Daniel |
| 3,685,331 | A | * | 8/1972 | Marcovitch ............... B21B 1/08 72/224 |
| 4,722,211 | A | * | 2/1988 | Tsukamoto ............. B21H 1/18 72/110 |
| 4,823,581 | A | * | 4/1989 | Kadotani ................. B21H 1/12 72/105 |
| 6,511,225 | B2 | * | 1/2003 | Tasch ...................... F16C 17/02 384/279 |
| 8,360,648 | B2 | * | 1/2013 | Maruyama .............. F16C 17/02 384/279 |

FOREIGN PATENT DOCUMENTS

| | | |
|---|---|---|
| JP | S59212142 A | 12/1984 |
| JP | 1-180743 A | 7/1989 |
| JP | H07275990 A | 10/1995 |
| JP | 8-243676 A | 9/1996 |
| JP | 2000-334537 A | 12/2000 |
| JP | 2000-343173 A | 12/2000 |
| JP | 2004-74281 A | 3/2004 |
| JP | 2005-262296 A | 9/2005 |
| JP | 2009279611 A | 12/2009 |

OTHER PUBLICATIONS

International Preliminary Report on Patentability dated Feb. 28, 2017, from the corresponding PCT/JP2015/073437.
Extended Search Report dated Apr. 26, 2018, of the counterpart European patent application No. 15833635.4-1016.

\* cited by examiner

Prior Art
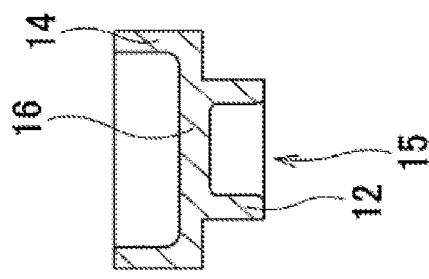
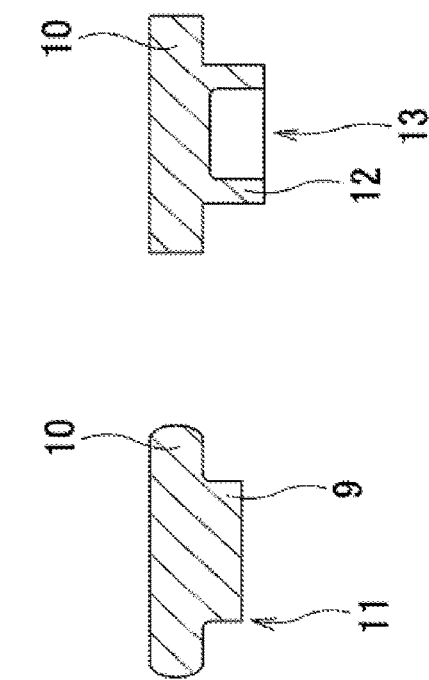
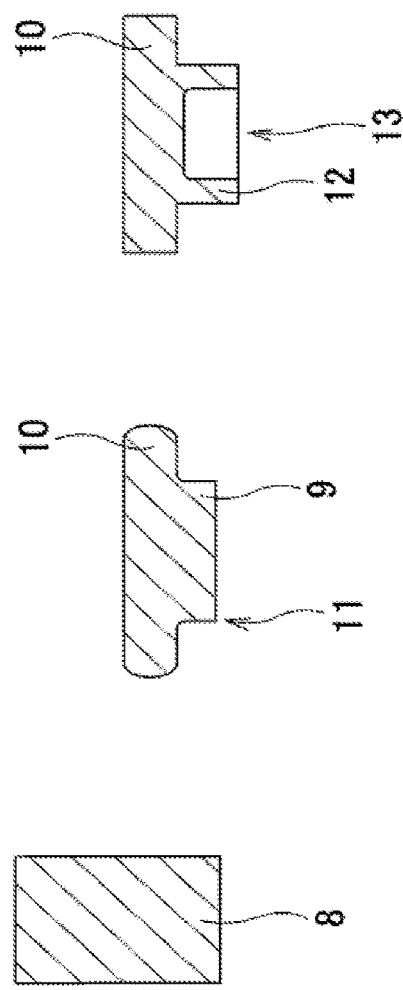
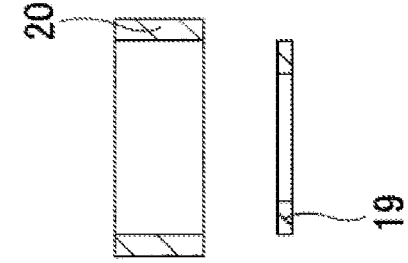
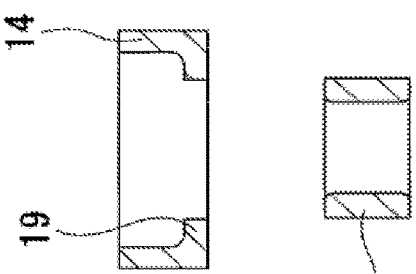
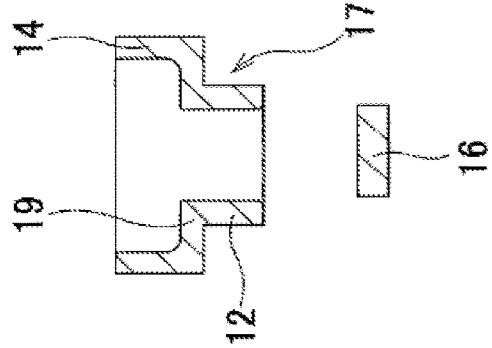

METHOD FOR MANUFACTURING RING-SHAPED MEMBER AND MANUFACTURING APPARATUS FOR SAME

TECHNICAL FIELD

The present invention relates to a method for manufacturing a ring-shaped member such as a bearing ring for a radial rolling bearing, and to a manufacturing apparatus for a ring-shaped member that can be directly used when performing this manufacturing method.

BACKGROUND ART

Radial ball bearings 1 such as illustrated in FIG. 21 are assembled in rotary member support sections of various kinds of rotating equipment. As a radial ball bearing 1, a single-row deep-groove radial ball bearing is used in which a plurality of balls 4 are rotatably provided between an outer ring 2 and an inner ring 3 that are concentric with each other. A deep-groove outer-ring raceway 5 is formed around the entire circumference of a middle portion in the axial direction of the inner-circumferential surface of the outer ring 2, and a deep-groove inner-ring raceway 6 is formed around the entire circumference of a middle portion in the axial direction of the outer-circumferential surface of the inner ring 3. With the plurality of balls 4 that are held by a cage 7 rotatably provided between the outer-ring raceway 5 and the inner-ring raceway 6, the outer ring 2 and inner ring 3 freely rotate relative to each other.

A low cost method for manufacturing bearing rings such as the outer ring 2 and the inner ring 3 of a radial ball bearing 1 such as described above is disclosed in JP2009-279611 (A). In this method, first, in a state in which the outer diameter of a bottom-end section of a circular column-shaped billet 8 illustrated in FIG. 22A is restrained, by crushing the billet 8 in the axial direction by performing an upsetting process on the billet 8, a first intermediate blank 11 having small-diameter section 9 and large-diameter section 10 such as illustrated in FIG. 22B is formed. Next, by processing the small-diameter section 9 into a small-diameter second cylindrical section 12 by performing a forward extrusion process on the small-diameter section 9, a second intermediate blank 13 as illustrated in FIG. 22C is obtained. Then, by further processing the large-diameter section 10 into a large-diameter first cylindrical section 14 by performing a rear extrusion process on the large-diameter section 10, a third intermediate blank 15 as illustrated in FIG. 22D is obtained. After that, by punching out a bottom-plate section 16 of the third intermediate blank 15 by performing a punching process on the third intermediate blank 15, a fourth intermediate blank 17 as illustrated in FIG. 22E is obtained. Then, as illustrated in FIG. 22F, a small-diameter cylindrical member 18 is obtained by punching out a portion that corresponds to the second cylindrical section 12 from the fourth intermediate blank 17 by performing a punching process on the fourth intermediate blank 17. Finally, as illustrated in FIG. 22G, a large-diameter cylindrical member 20 is obtained by punching out an inward-facing flange section 19 from a portion that corresponds to the first cylindrical section 14. Both the small-diameter cylindrical member 18 and large-diameter cylindrical member 20 that are obtained in this way are annular shaped metal members.

The small-diameter cylindrical member 18 is the blank for the inner ring 3, however, an inner-ring raceway 6 is not formed around the outer-circumferential surface of the small-diameter cylindrical member 18, and the outer diameter dimension, the axial-direction dimension, and the shape of the inner-circumferential surface and the outer-circumferential surface are not the dimensions and shape of the inner ring 3. Moreover, the large-diameter cylindrical member 20 is the blank for the outer ring 2, however, an outer-ring raceway 5 is not formed around the inner-circumferential surface of the large-diameter cylindrical member 20, and the inner-diameter dimension, the outer-diameter dimension, the axial-direction dimension, and the shape of the inner-circumferential surface and the outer-circumferential surface are not the dimensions and shape of the outer ring 2. Performing work to process the small-diameter cylindrical member 18 into the shape of the inner ring 3, and to process the large-diameter cylindrical member 20 into the shape of the outer ring 2 by a rolling process is disclosed in JP2009279611 (A) and JPS59212142 (A).

FIG. 23 and FIG. 24 illustrate a manufacturing apparatus 21 for a ring-shaped member as disclosed in JPS59212142. The manufacturing apparatus 21 is an apparatus for processing annular shaped metal blank 26 such as the small-diameter cylindrical member 18 into a ring-shaped member 22 such as the inner ring 3 by performing a rolling process, and includes a mandrel 23, a forming roll 24, and a support roll 25.

The mandrel 23 has a first rolling surface 27 for performing a rolling process on the inner-circumferential surface of the metal blank 26, and a pair of cylindrical surface shaped mandrel-side regulating surfaces 28 that are provided on both sides in the axial direction of the first rolling surface 27. The first rolling surface 27 is such that the middle portion in the axial direction has a cylindrical surface shape (cross-sectional linear shape) of which the outer diameter does not change with respect to the axial direction, and the portions near both ends in the axial direction have cross-sectional arc shapes of which the outer diameter becomes larger going toward both ends in the axial direction. The mandrel 23 is supported by a cradle 29 so that displacement in the axial direction (up-down direction in FIG. 23 and FIG. 24), and rotation around the center axis of the mandrel 23 are possible.

The forming roll 24 has: a second rolling surface 30 that has a cylindrical shape and is formed around the middle section in the axial direction of the outer-circumferential surface, and is for performing a rolling process on the outer-circumferential surface of the metal blank 26; and a pair of cylindrical surface shaped forming-roll-side regulating surfaces 31 that are formed on both side in the axial direction of the second rolling surface 30. The second rolling surface 30 is such that the portions near both ends in the axial direction have a cylindrical surface shape (cross-sectional linear shape) of which the outer diameter does not change in the axial direction, and the portion near the center in the axial direction has a cross-sectional arc shape of which the outer diameter becomes larger going toward the center in the axial direction. The forming roll 24, is such that in a state in which the center axis of the forming roll 24 is parallel with the center axis of the mandrel 23, the second rolling surface 30 is made to face the first rolling surface 27 of the mandrel 23. The forming roll 24 is able to displace (move toward or away from the mandrel 23) in the horizontal direction (left-right direction in FIG. 23 and FIG. 24) while rotating.

The support roll 25 includes a pair of rollers 32 that arranged with a specified space in the axial direction provided in between. The support roll 25 is provided on the opposite side of the forming roll 24 with respect to the center axis of the mandrel 23 so that the center axis of the support roll 25 is parallel with the center axis of the mandrel 23, and part of the outer-circumferential surface of the roller 32 is made to face the mandrel-side regulating surface 28. The rotating shaft of the forming roll 24 and the rotating shaft of the support roll 25 are coupled together by a synchronizing mechanism 33, and the forming roll 24 and support roll 25 are able to rotate in synchronization, being rotated and driven by an electric motor 34.

Next, the procedure for manufacturing the ring-shaped member 22 by performing a rolling process on the metal blank 26 using the manufacturing apparatus 21 for a ring-shaped member will be explained with reference to FIG. 24. First, as illustrating in FIG. 24A, in a state in which the mandrel 23 is inserted into the space in the radial direction of the metal blank 26, part in the circumferential direction of the metal blank 26 is arranged between the first rolling surface 27 of the mandrel 23 and the second rolling surface 30 of the forming roll 24. Part in the circumferential direction of the outer-circumferential surface of the pair of rollers 32 of the support roll 25 are made to closely face the pair of mandrel-side regulating surfaces 28 of the mandrel 23.

Next, in a state in which the forming roll 24 and the support roll 25 are rotated and driven by rotating and driving the electric motor 34, the forming roll 24 is made to displace in a direction toward the mandrel 23 (toward the left side in FIG. 23 and FIG. 24). As a result, the outer-circumferential surface of the forming roll 24 comes in contact with the outer-circumferential surface of the metal blank 26, which causes the metal blank 26 to rotate. As the forming roll 24 is made to displace further toward that mandrel 23 from the state of contact between the outer-circumferential surface of the forming roll 24 and outer-circumferential surface of the metal blank 26, the mandrel 23 is pressed by way of the metal blank 26, and the outer-circumferential surface of the mandrel 23 comes in contact with the outer-circumferential surfaces of the pair of rollers 32 of the support roll 25. In a state in which the outer-circumferential surface of the mandrel 23 is in contact with the outer-circumferential surface of the rollers 32, the mandrel 23 is made to rotate due to the rotation of the rollers 32. In this state in which the outer-circumferential surface of the mandrel 23 is in contact with the outer-circumferential surface of the rollers 32, the support roll 25 supports the mandrel 23 so that the mandrel 23 does not displace toward the left side in FIG. 23 and FIG. 24.

As the forming roll 24 is made to further displace in a direction toward the mandrel 23 from a state in which the outer-circumferential surface of the mandrel 23 is in contact with the outer-circumferential surface of the rollers 32, part in the circumferential direction of the metal blank 26 is pressed in between the forming roll 24 and the mandrel 23 that is supported by the support roll 25, and at the same time that the first rolling surface 27 of the mandrel 23 is rolled over the inner-circumferential surface of the metal blank 26, the second rolling surface 30 of the forming roll 24 is rolled over the outer-circumferential surface of the metal blank 26. As this kind of rolling process is performed, the outer-diameter dimension and the axial-direction dimension of the metal blank 26 increase. When the forming-roll-side regulating surface 31 of the forming roll 24 comes in contact with the mandrel-side regulating surface 28 of the mandrel 23, displacement of the forming roll 24 in the direction toward the mandrel 23 is stopped, and the rolling process ends. The inner ring 3 is obtained by performing a cutting process, a grinding process and a finishing process on the ring-shaped member 22 that was obtained by this kind of rolling process.

With this kind of manufacturing method for a ring-shaped member, it is possible to make the processing apparatus more compact than in the case of manufacturing a ring-shaped member 22 by performing a forging process on the metal blank 26, and it is possible to make the machining allowance small when performing a cutting process and a turning process, so it is possible to reduce the equipment cost and material cost. However, in this kind of manufacturing method, means for regulating the outer-diameter dimension of the ring-shaped member are not provided, so there is a possibility that variation in the shape (outer-diameter dimension and axial-direction dimension) of the ring-shaped member 22 will occur due to variation in the outer-dimensional shape of the metal blank 26 or due to variation in the assembled state of the metal blank 26 in a processing apparatus. When variation in the shape of the ring-shaped member 22 occurs, there is a possibility that the finishing process (cutting process and grinding process) will become troublesome, and that manufacturing costs will increase.

In JPH07275990 (A), technology is disclosed in which variation in the shape of a ring-shaped member is prevented by using a metal die that is capable of regulating the outer-diameter dimension and axial-direction of a ring-shaped member after a rolling process. However, in this technology, when the volume of the metal blank being used is larger than a specified value, the molding space of the metal die will become filled by the metal blank in a step before pressure by the forming roll is finished, and there is a possibility that the internal stress on this metal blank will become to high, and that it will become easy for damage to the mandrel to occur. Even when the mandrel is not damaged, the metal blank which had no place to go in the molding space of the metal die is distorted and thus there is a possibility that the roundness of the ring-shaped member becomes bad. When there is damage to the mandrel or when the roundness of the ring-shaped member becomes bad, there is a possibility that a change in volume of the metal blank will occur due to a temperature change in the metal die.

RELATED LITERATURE

Patent Literature

[Patent Literature 1] JP2009279611 (A)
[Patent Literature 2] JPS59212142 (A)
[Patent Literature 3] JPH07275990 (A)

SUMMARY OF INVENTION

Problem to be Solved by Invention

Taking into consideration the problems described above, the object of the present invention is to proved a manufacturing method and a manufacturing apparatus for a ring-shaped member that are capable of preventing the occurrence of damage to a mandrel, and capable of improving the precision of the shape of a ring-shaped member after processing regardless of variation in the volume of a metal blank.

Means for Solving Problems

The manufacturing apparatus for a ring-shaped member of the present invention is an apparatus for forming a ring-shaped member by performing a rolling process on the inner-circumferential surface and outer-circumferential surface of an annular-shaped metal blank, and includes a mandrel, an outer-diameter constraining die, and an excess material release means.

The mandrel is rotatably supported around the center axis of the mandrel, and has a pair of support shaft sections and a rolling shaft section, in which the pair of support shaft sections have a larger diameter than the rolling shaft section, and are provided so as to be separated in the axial direction from each other and concentric with each other, and the rolling shaft section is provided between the pair of support shaft sections so as to be concentric with the pair of support shaft sections, and has a first rolling surface for performing a rolling process on the inner-circumferential surface of the metal blank being formed around the outer circumferential surface thereof.

The outer-diameter constraining die has an annular shape, is supported in a state in which the center axis of the outer-diameter constraining die is parallel with the center axis of the mandrel and is able to rotate around the center axis of the outer-diameter constraining die, has a second rolling surface for performing a rolling process on the outer-circumferential surface of the metal blank being formed around the inner-circumferential surface thereof, and is arranged so that the rolling shaft section is inserted into the inner-diameter side thereof and the second rolling surface faces the first rolling surface.

The excess material release means is such that by displacing in the axial direction and/or radial direction when a pressing force having a specified size or greater is received from the metal blank in the axial direction and/or radial direction during processing of the metal blank, a molding space that is defined by the first rolling surface of the mandrel, the second rolling surface of the outer-diameter constraining die, and the end surfaces on the rolling shaft section side of the pair of support shaft sections expands, allowing the excess material of the metal blank to be released.

The manufacturing apparatus for a ring-shaped member of the present invention forms the ring-shaped member, in a state in which part in the circumferential direction of the metal blank is arranged in the molding space, by performing a rolling process on the inner-circumferential surface and outer-circumferential surface of the metal blank by rotating the mandrel around the center axis of the mandrel together with rotating the outer-diameter constraining die around the center axis of the outer-diameter constraining die, and pressing the metal blank between the first rolling surface and the second rolling surface.

A first aspect of a manufacturing apparatus for a ring-shaped member of the present invention is such that the excess material release means is at least one support shaft section of the pair of support shaft sections, the at least one support shaft section formed separately from the rolling shaft section, and during processing of the metal blank, when the at least one support shaft section receives a pressing force in the axial direction from the metal blank that is a specified size or greater, the at least one support shaft section is able to displace in the axial direction in a direction going away from the rolling shaft section.

In this first aspect of a manufacturing apparatus for a ring-shaped member, preferably the manufacturing apparatus for a ring-shaped member further comprises an energizing means that elastically presses the at least one support shaft section in the axial direction in a direction toward the rolling shaft section.

In this first aspect of a manufacturing apparatus for a ring-shaped member, the outer-diameter constraining die has a plurality of outer-diameter constraining die elements that have an annular shape and are arranged side-by-side in the axial direction, and the second rolling surface is constructed by the inner-circumferential surfaces of the plurality of outer-diameter constraining die elements and is for performing a rolling process on the outer-circumferential surface of the metal blank in order to form chamfer sections in the corner sections that are connecting sections between the outer-circumferential surface and both end surfaces in the axial direction of metal blank, and the plurality of outer-diameter constraining die elements are able to displace in a direction going away from each other when, during processing of the metal blank, pressing forces in the axial direction having a specified size or greater are received from the metal blank.

In this case, preferably the outer-diameter constraining die further comprise an annular-shaped outer-circumference holding member, and the outer-diameter constraining die is formed by fitting the outer-circumference holding member around the outer-circumferential surfaces of the plurality of outer-diameter constraining die elements in a state that allows the plurality of outer-diameter constraining die elements to displace in the axial direction.

A second aspect of a manufacturing apparatus for a ring-shaped member of the present invention is such that the excess material release means is a movable annular-shaped member that is provided in a portion that faces the inner-circumferential surface of the metal blank when using the manufacturing apparatus for a ring-shaped member, a portion of the rolling shaft section that is separated in the axial direction from the portion where the first rolling surface is formed is inserted into the inner side in the radial direction of the movable annular-shaped member, and that movable annular-shaped member is able to displace in the radial direction when, during processing of the metal blank, a pressing force in the radial direction having a specified size or greater is received from the metal blank.

A manufacturing method for a ring-shaped member of the present invention uses the manufacturing apparatus for a ring-shaped member of the invention such as described above and forms a ring-shaped member by performing a rolling process on the inner-circumferential surface and outer-circumferential surface of an annular-shaped metal blank. In the case of the manufacturing method for a ring-shaped member of the present invention, the excess material release means expands the molding space and allows excess material of the metal blank to be released by displacing in the axial direction and/or radial direction when, during processing of the metal blank, a pressing force in the axial direction and/or radial direction having a specified size or greater is received from the metal blank.

Effect of Invention

With the present invention, it is possible to prevent the occurrence of damage to the mandrel and improve the precision of the shape of a ring-shaped member after processing regardless of variation in the volume of a metal blank. In other words, in the present invention, construction is such that an excess material release means is able to displace in the axial direction and/or radial direction when, during processing of a metal blank, a pressing force having a specified size or greater is received in the axial direction and/or radial direction from the blank material. Therefore, even when the internal stress inside the metal blank inside the molding space increases during processing of the metal blank, the excess material release means displaces in the axial direction and/or radial direction, making it possible for the molding space to expand and for excess material of the metal blank to be released to the expanded portion. As a result, the internal stress inside the metal blank inside the molding space decreases, and thus it is possible to reduce the stress applied to the mandrel. Moreover, the internal stress inside the metal blank can be reduced during processing, so it is possible to prevent the metal blank from being distorted inside the molding space. Consequently, it is possible to prevent the roundness of the ring-shaped member from becoming worse during processing.

Even in the case where the volume of a metal blank is greater than a specified size (target volume of the ring-shaped member) due to variation in the volume of the metal blank, there is a possibility that the internal stress inside the metal blank inside the molding space will increase. Even in a case such as this, with the present invention, displacement of the excess material release means makes it possible to reduce the internal stress inside the metal blank and thus reduce the stress applied to the mandrel, and it is possible to prevent the metal blank from being distorted inside the molding space.

BRIEF DESCRIPTION OF DRAWINGS

FIG. 22A to FIG. 22G are cross-sectional views that illustrate an example of a known process for forming an annular shaped metal blank;

DETAILED DESCRIPTION OF THE INVENTION

First Example

Figure 1:
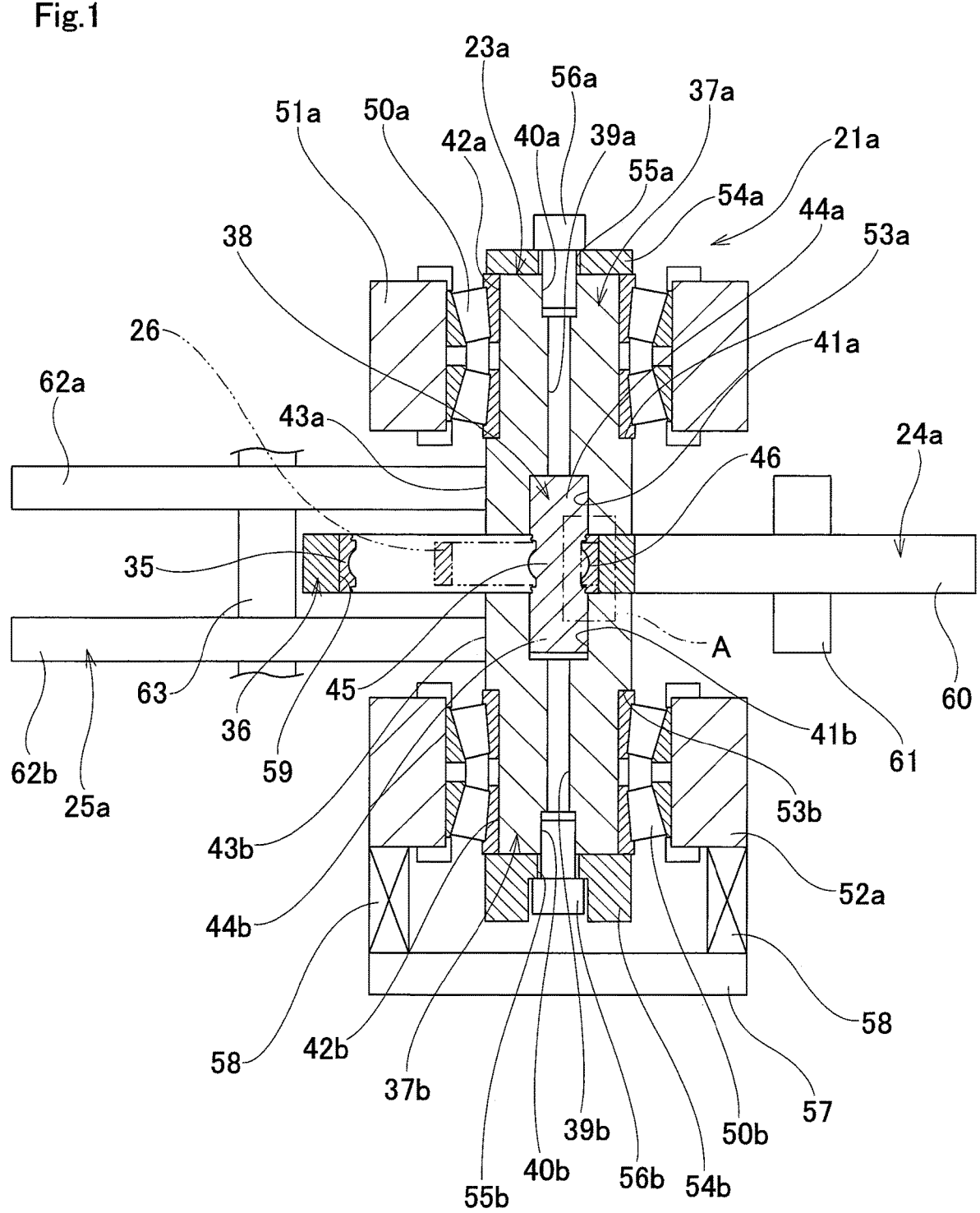
FIG. 1 is a cross-sectional view illustrating a manufacturing apparatus for a ring-shaped member of a first example of an embodiment of the present invention.
Figure 23:
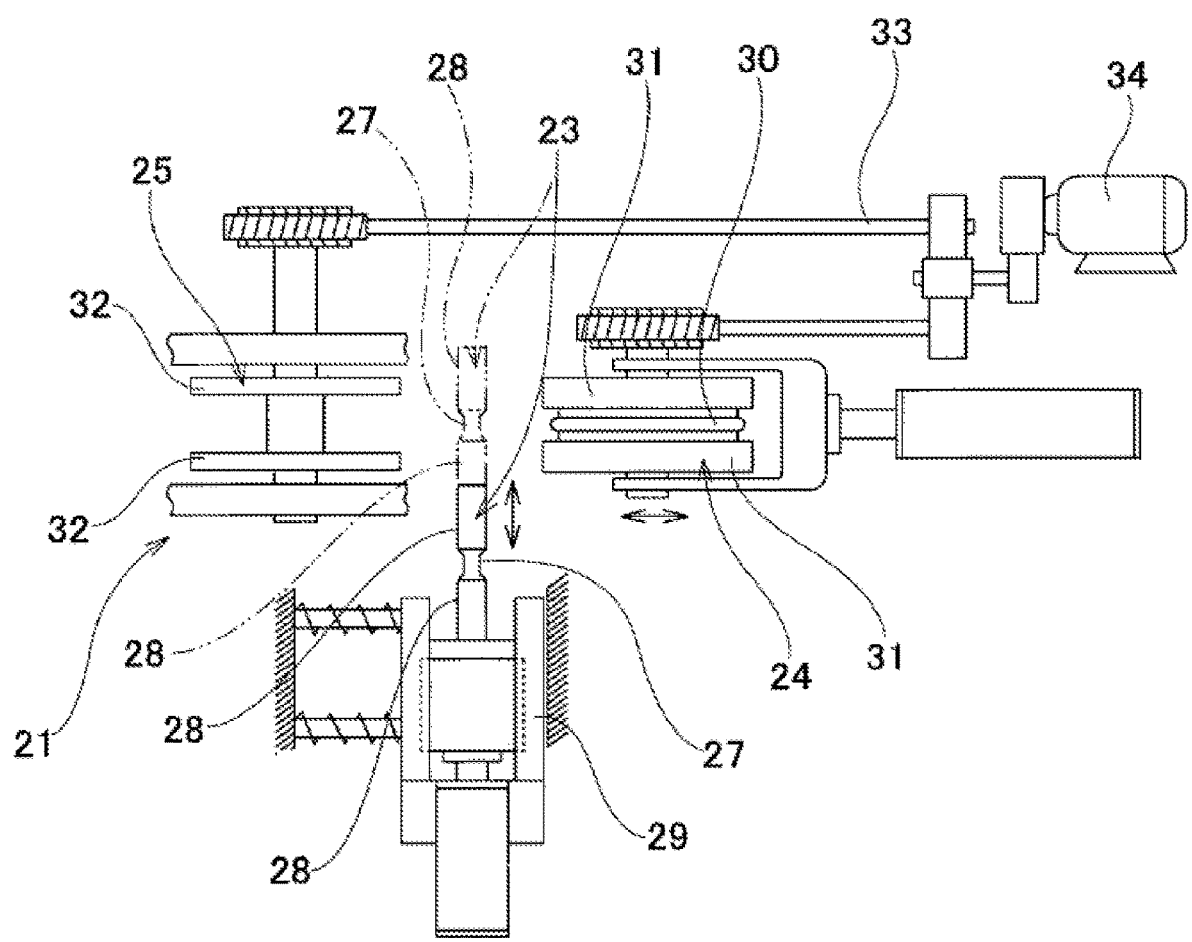
FIG. 23 illustrates a rolling apparatus that was conventionally used.
Figure 24:
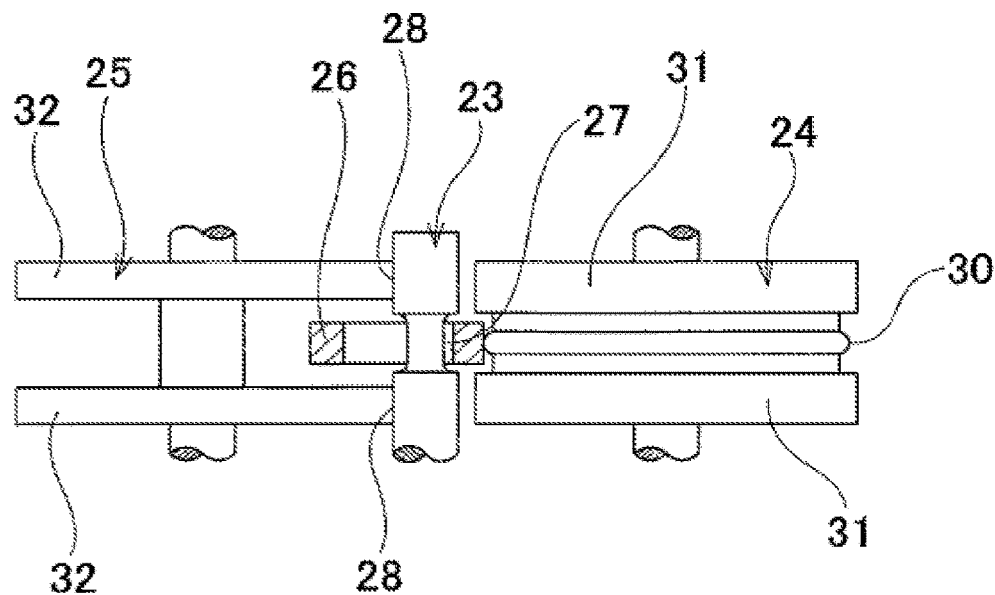
FIG. 24A and FIG. 24B are for explaining a procedure for processing a metal blank into a ring-shaped member by using a conventional rolling apparatus.
Figure 24:
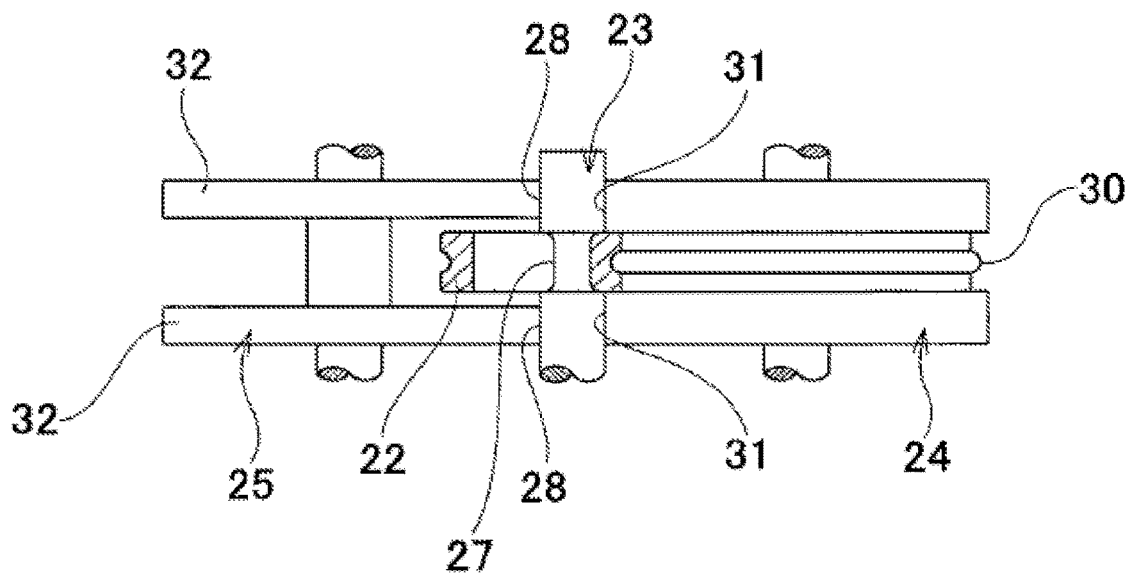

FIG. 1 and FIG. 23 illustrate a first example of an embodiment of the present invention. Features of the manufacturing method and manufacturing apparatus for a ring-shaped member of this example are construction for regulating the outer-diameter dimension of a ring-shaped member 35 after processing, and a means for removing excess material in order to allow excess material of a metal blank 26 to be released in the axial direction during processing of the metal blank 26. The construction and functions of the other parts are the same as those of the conventional manufacturing method and manufacturing apparatus illustrated in FIG. 23 and FIGS. 24A and 24B. This example illustrates a manufacturing method and manufacturing apparatus for making a ring-shaped member for an outer ring by performing a rolling process on a metal blank 26. However, the manufacturing method and manufacturing apparatus for a ring-shaped member of the present invention can also be applied to a ring-shaped member for an inner ring as in the case of the conventional manufacturing method and manufacturing apparatus illustrated in FIG. 23 and FIGS. 24A and 24B.

The manufacturing apparatus 21a for a ring-shaped member of this example includes a mandrel 23a, an outer-diameter constraining die 36, a forming roll 24a and a support roll 25a. The mandrel 23a has a pair of support shaft sections 37a, 37b that are each made of a metal such as die steel, high-speed steel, cemented carbide and the like, and that are provided so as to be concentric with each other and separated from each other in the axial direction, and a rolling shaft section 38 that is concentrically provided in the axial direction between the pair of support shaft sections 37a, 37b.

Of the pair of support shaft sections 37a, 37b, one (top one in FIG. 1) of the support shaft sections 37a is a hollow shaft that has a center hole 39a through the center hole that is open on both ends in the axial direction. Of this center hole 39a, a threaded hole 40a is formed in a portion near one end in the axial direction (top end in FIG. 1), and of this center hole 39a, a fitting hole 41a having a larger diameter than the middle section in the axial direction is formed in a portion near the other end in the axial direction (bottom end in FIG. 1). A small-diameter cylindrical section 42a is formed on half of one side in the axial direction of the outer-circumferential surface of the one support shaft section 37a, and the diameter thereof is smaller than the half on the other side in the axial direction and does not change in the axial direction. The half on the other side of the outer-circumferential surface of the one support shaft section 37a functions as a mandrel-side regulating surface 43a. The center hole 39a may also be used for inserting a rod-shaped knock-out jig through when removing a rolling shaft section 38 from the one support shaft section 37a.

Of the pair of support shaft sections 37a, 37b, the other (bottom one in FIG. 1) support shaft section 37b has a shape that is symmetrical with the one support-shaft section 37a in the up-down direction of FIG. 1. In other words, the other support shaft section 37b is a hollow shaft having a center hole 39b in the center that is open on both ends in the axial direction. Of this center hole 39b, a fitting hole 41b having a diameter that is larger than the middle section in the axial direction is formed in the portion near one end in the axial direction (top end in FIG. 1), and of this center hole 39b, a threaded hole 40b is formed in the portion near the other end in the axial direction (bottom end in FIG. 1). A small-diameter cylindrical section 42b is formed on half of the other side in the axial direction of the outer-circumferential surface of the other support shaft section 37b, and the diameter thereof is smaller than the half on the one side in the axial direction and does not change in the axial direction. The half on the one side of the outer-circumferential surface of the other support shaft section 37b functions as a mandrel-side regulating surface 43b. The pair of support shaft sections 37a, 37b are preferably made of a metal such as cemented carbide that has high rigidity. Moreover, the outer-diameter dimension of the pair of support shaft sections 37a, 37b can be appropriately set, and when the outer-diameter dimension of the support shaft sections 37a, 37b is small, preferably the pair of support shaft sections 37a, 37b are made of steel such as die steel, high-speed steel, or the like that does not crack easily.

The rolling shaft 38 is a solid rod-shaped member having an axial-direction dimension that is smaller than the pair of support shaft sections 37a, 37b, and includes a pair of fitting sections 44a, 44b that are provided on portions near both ends in the axial direction, and a rolling surface section 45 that is provided in the axial direction between the pair of fitting sections 44a, 44b. The pair of fitting sections 44a, 44b have a circular column shape, the outer diameter of which does not change in the axial direction. The outer-diameter dimension of one fitting section 44a of the pair of fitting sections 44a, 44b is a little larger than the inner-diameter dimension of the fitting hole 41a of the one support shaft section 37a, and the outer-diameter dimension of the other fitting section 44b of the pair of fitting sections 44a, 44b is a little smaller than the inner-diameter dimension of the fitting hole 41b of the other support shaft section 37b.

The rolling surface section 45 is such that a first rolling surface 46 for performing a rolling process on the inner-circumferential surface of the metal blank 26 is formed around the outer-circumferential surface thereof. The first rolling surface 46 has a shape that corresponds to the shape of the inner-circumferential surface of the ring-shaped member 35 that will be obtained by performing a rolling process on the metal blank 26, and includes a raceway forming section 47 that is formed around the middle section in the axial direction, a pair of cylindrical surface sections 48 that are formed around both sides in the axial direction of the raceway forming section 47, and groove forming sections 49 that are formed around portions near both ends in the axial direction. The raceway forming section 47 is for forming by rolling an outer-ring raceway around the inner-circumferential surface of the metal blank 26, and the cross-sectional shape (shape of the generating line) on an imaginary plane that passes through the center axis of the mandrel 23a is a semicircular arc shape, the outer diameter of which becomes larger going toward the center in the axial direction. The pair of groove forming sections 49 are for forming by rolling locking grooves for locking the outer-circumferential edge of seal rings to portions near both ends in the axial direction of the inner-circumferential surface of the metal blank 26, and the cross-sectional shape (shape of the generating line) of the respective groove forming sections 49 on an imaginary plane that passes through the center axis of the mandrel 23a is an S shape that smoothly connects a convex section that is formed on the side of the raceway forming section 47, and a concave section that is formed on both sides in the axial direction of the rolling surface section 45.

The rolling shaft section 38 is supported and fastened by one fitting section 44a fitting inside the fitting hole 41a of the one support shaft section 37a with an interference fit, with displacement in the axial direction and inclination with respect to the one support shaft section 37a being regulated. The rolling shaft section 38 can displace in the axial direction with respect to the other support shaft section 37b by the other fitting section 44b fitting inside the fitting hole 41b of the other support shaft section 37b with a loose fit. The outer-diameter dimension of the other fitting section 44b and the inner-diameter dimension of the fitting hole 41b of the other support shaft section 37b are regulated within a range such that displacement in the axial direction of the rolling shaft section 38 with respect to the other support shaft section 37b is possible, and so that looseness in the radial direction of the rolling shaft section 38 and the size of inclination with respect to the other support shaft section 37b are a minimum.

The one support shaft section 37a of the mandrel 23a is supported by a fixed support section 51a, which is fastened to and supported by a fixed portion of the housing or the like that does not displace during processing of the metal blank 26, by way of a double-row radial tapered roller bearing 50a that is rotatably fitted around the outside of the small-diameter cylindrical section 42a. The fixed support section 51a, except during processing of the metal blank 26, can be moved out of the way in the axial direction for example, in order that the metal blank 26 can be mounted or removed. The surface on the other end in the axial direction of the inner ring of the radial tapered roller bearing 50a comes in contact with a stepped section 53a that connects the other end section in the axial direction of the small-diameter cylindrical section 42a and the one end section in the axial direction of the mandrel-side regulating surface 43a. The surface of the one end in the axial direction of radial tapered roller bearing 50a comes in contact with the surface on the other end in the axial direction of a constraining member 54a that is attached to the one end in the axial direction of the one support shaft section 37a. With this kind of construction, it is possible to position the radial tapered roller bearing 50*a* in the axial direction. The constraining member 54*a* has a circular ring plate shape, and by passing a bolt 56*a* through a through hole 55*a* that is formed in the center section, and screwing that bolt 56*a* into the threaded hole 40*a* of the one support shaft section 37*a*, the constraining member 54*a* is attached to the one end section in the axial direction of this one support shaft section 37*a*. The one support shaft section 37*a* is supported by the fixed support section 51*a* by way of the radial tapered roller bearing 50*a*, so it is possible to reduce vibration of the other end section of the one support shaft section 37*a* (end section on the side of the rolling shaft section 38).

The other support shaft section 37*b* of the mandrel 23*a* is supported by a displaceable support section 52*a* by way of a double-row radial tapered roller bearing 50*b* that is rotatably fitted around the outside of the small-diameter cylindrical section 42*b*. The displaceable support 52*a* is supported so as to be able to displace in the axial direction with respect to a fixed portion 57 such as a cradle that does not displace during processing of the metal blank 26, and other than during processing of the metal blank 26, can be moved out of the way in the axial direction, for example, in order mount or remove the metal blank 26.

The surface of the one end in the axial direction of the inner ring of the radial tapered roller bearing 50*b* comes in contact with a stepped section 53*b* that connects the one end section in the axial direction of the small-diameter cylindrical section 42*b* and the other end section in the axial direction of the mandrel-side regulating surface 43*b*. The surface of the other end in the axial direction of the inner ring of the radial tapered roller bearing 50*b* comes in contact with the surface of the one end in the axial direction of a constraining member 54*b* that is attached to the other end section in the axial direction of the other support shaft section 37*b*. With this kind of construction, it is possible to position the radial tapered roller bearing 50*b* in the axial direction. The constraining member 54*b* has a circular column shape, and by passing a bolt 56*b* through a stepped through hole 55*b* that is formed in the center section, and screwing that bolt 56*b* into the threaded hole 40*b* of the other support shaft section 37*b*, the constraining member 54*b* is attached to the other end section in the axial direction of this other support shaft section 37*b*.

Moreover, a mechanical type (spring or the like), hydraulic type, gas pressure type, or pneumatic type elastic member 58 is provided between the displaceable support section 52*a* and the fixed portion 57, and the elastic member 58 elastically presses the other support shaft section 37*b* toward the rolling shaft section 38 (upward in FIG. 1). In other words, in this example, the elastic member 58 corresponds to an energizing means. The other support shaft section 37*b* and the displaceable support section 52*a* can displace in the axial direction with respect to the one support shaft section 37*a* and the rolling shaft section 38. The elastic force of the elastic member 58 (force pressing the other support shaft section 37*b*) is appropriately set, however, the elastic force is set so as to be smaller than the pressing force by which metal blank 26 presses the other support shaft section 37*b* in the axial direction when processing the metal blank 26 and in the state that the molding space that is formed between the first rolling surface 46 of the mandrel 23*a*, the second rolling surface 59 of the outer-diameter constraining die 36, and the end surfaces on the rolling shaft section 38 side of the pair of support shaft sections 37*a*, 37*b*, is filled with the metal blank 26. From the aspect of synchronizing the movement in the horizontal direction (left-right direction in FIG. 1) of the one support shaft section 37*a* and the other support shaft section 37*b*, preferably the fixed support section 51*a* and the displaceable support section 52*a* are supported in common by the fixed portion 57.

The outer-diameter constraining die 36 is an annular shaped member that is made of a metal such as die steel, high-speed steel, cemented carbide or the like, and the outer circumferential surface is a cylindrical surface, the outer diameter of which does not change in the axial direction. A second rolling surface 59 for performing a rolling process on the outer-circumferential surface of the metal blank 26 is formed around the inner-circumferential surface of the outer-diameter constraining die 36. The second rolling surface 59 is a cylindrical surface, the inner diameter of which does not change in the axial direction. The outer-diameter constraining die 36 causes the second rolling surface 59 to face the first rolling surface 46 when the rolling shaft section 38 of the mandrel 23 is inserted inside in the radial direction. In this state, the center axis of the outer-diameter constraining die 36 is parallel with the center axis of the mandrel 23*a*.

The forming roll 24*a* has one metal roller 60 and a rotating shaft 61 that is inserted through the center hole in this roller 60, and is arranged on the outer-diameter side of the outer-diameter constraining die 36 with this rotating shaft 61 (center axis of the roller 60) being parallel to the center axes of the mandrel 23*a* and the outer-diameter constraining die 36. The forming roll 24, as in the conventional construction described above and illustrated in FIG. 23 and FIGS. 24A and 24B, can be moved toward or away from the outer-diameter constraining die 36 (can displace in the horizontal direction or in the left-right direction in FIG. 1) by an actuator such as a hydraulic cylinder (not illustrated in the figures), while being rotated and driven by the rotation of the electric motor 34 (see FIG. 23).

The support roll 25*a* includes a pair of metal rollers 62*a*, 62*b*, and a rotating shaft 63 that is inserted through this pair of rollers 62*a*, 62*b*. The support roll 25*a* is arranged on the opposite side of the center axis of the mandrel 23 from the forming roll 24*a*, with the rotating shaft 63 (center axis of rollers 62*a* and 62*b*) parallel to the center axes of the mandrel 23*a*, outer-diameter constraining die 36 and forming roll 24*a*. The support roll 25*a* is rotated and driven in synchronization with the forming roll 24*a* by rotating and driving the electric motor 34. The support roll 25*a* is for regulating displacement of the mandrel 23*a* toward the support roll 25*a* side during processing by causing part of the outer-circumferential surfaces of the pair of rollers 62*a*, 62*b* to come in contact with the mandrel-side regulating surfaces 43*a*, 43*b* of the mandrel 23. In this example, the support roll 25*a* is regulated during processing of the metal blank 26 so as not to displace in the horizontal direction, and the support roll 25*a* does not press the mandrel 23*a* toward the forming roll 24*a* side. However, it is also possible to configure the support roll 25*a* so that during processing of the metal blank 26 the support roll 25*a* displaces toward the forming roll 24*a* side and presses the mandrel 23*a* toward the forming roll 24*a* side. In this case, the forming roll 24*a* can be configured so as to displace in the horizontal direction, or can be configured so as not to displace in the horizontal direction.

The procedure for manufacturing a ring-shaped member 35 by using a manufacturing apparatus 21*a* for a ring-shaped member to perform a rolling process on a metal blank 26 will be explained. First, with the mandrel 23*a* inserted through the inside in the radial direction of the metal blank 26, part in the circumferential direction of the metal blank 26 is placed inside a molding space that is formed between the first rolling surface 46 of the mandrel 23a, the second rolling surface 59 of the outer-diameter constraining die 59, and the end surfaces on the rolling shaft section 38 side of the pair of support shaft sections 37a, 37b. Moreover, parts of the outer-circumferential surfaces of the pair of rollers 62a, 62b of the support roller 25a are made to closely face the mandrel-side regulating surfaces 43a, 43b of the mandrel 23a.

Next, when the forming roll 24a and support roll 25a are rotated and driven by rotating and driving the electric motor 34, the forming roll 24a is displaced in the horizontal direction so as to move close to the outer-diameter constraining die 36, and the outer-circumferential surface of the roller 60 of the forming roll 24a is made to come in contact with the outer-circumferential surface of the outer-diameter constraining die 36. The outer-diameter constraining die 36 is made to rotate due to the rotation of the forming roll 24a.

When the forming roll 24a is made to further displace (is pressed) toward the outer-diameter constraining die 36 from the state of the outer-circumferential surface of the roller 60 coming in contact with the outer-circumferential surface of the outer-diameter constraining die 36, the mandrel 23a is pressed toward the left side in FIG. 1 by the roller 60 by way of the outer-diameter constraining die 36 and metal blank 26, and the outer-circumferential surfaces of the rollers 62a, 62b of the support roll 25a strongly come into contact with (are pressed against) the mandrel-side regulating surfaces 43a, 43b of the mandrel 23. In this state, the mandrel 23a is made to rotate due to the rotation of the rollers 62a, 62b of the support roll 25a. Moreover, in this state, the outer-diameter constraining die 36 and mandrel 23a rotate in synchronization, and the metal blank 26 rotates due to the rotation of the outer-diameter constraining die 36 and mandrel 23a.

When displacing (pressing) the forming roll 24a further toward the outer-diameter constraining die 36 from this state, first, both ends in the axial direction of the metal blank 26 are plastically deformed so that the axial-direction dimension of the metal blank 26 becomes larger until coming in contact with the end surfaces on the rolling shaft section 38 side of the pair of support shaft sections 37a, 37b. When both ends in the axial direction of the metal blank 26 come in contact with the end surfaces on the rolling shaft section 38 side of the pair of support shaft sections 37a, 37b, the outer-circumferential surface of the metal blank 26 is plastically deformed so that the outer diameter becomes larger until coming in contact with the inner-circumferential surface of the outer-diameter constraining die 36 around the entire circumference. Then the molding space that is formed between the first rolling surface 46 of the mandrel 23a, the second rolling surface 59 of the outer-diameter constraining die 36, and the end surfaces on the rolling shaft section 38 side of the pair of support shaft sections 37a, 37b is filled with the metal blank 26. As a result, at the same time that the first rolling surface 46 of the mandrel 23a is rolled by the inner-circumferential surface of the metal blank 26, the second rolling surface 59 of the outer-diameter constraining die 36 is rolled by the outer-circumferential surface of the metal blank 26. Of both end surfaces in the axial direction of the metal blank 26, the end surface on the other support shaft section 37b side is in a state of contact with the other support shaft section 37b, and in this state, a pressing force in the axial direction is applied to the other support shaft section 37b from the metal blank 26. In this example, the elastic force of the elastic member 58 (force by which the elastic member 58 presses the other support shaft section 37b) is set to be larger than the pressing force that is applied to the other support shaft section 37b in the state before the molding space becomes filled with the metal blank 26. Therefore, in the state before the molding space becomes filled with the metal blank 26, the other support shaft section 37b does not displace in the axial direction.

Figure 2:
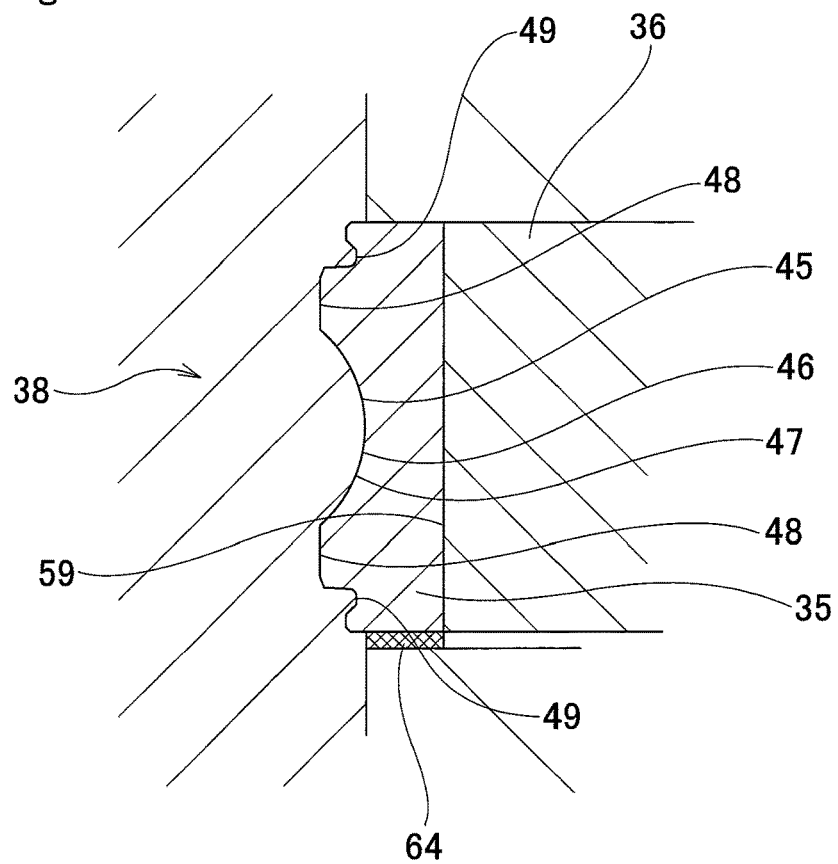
FIG. 2 is an enlarged cross-sectional view that corresponds to A in FIG. 1.
Figure 21:
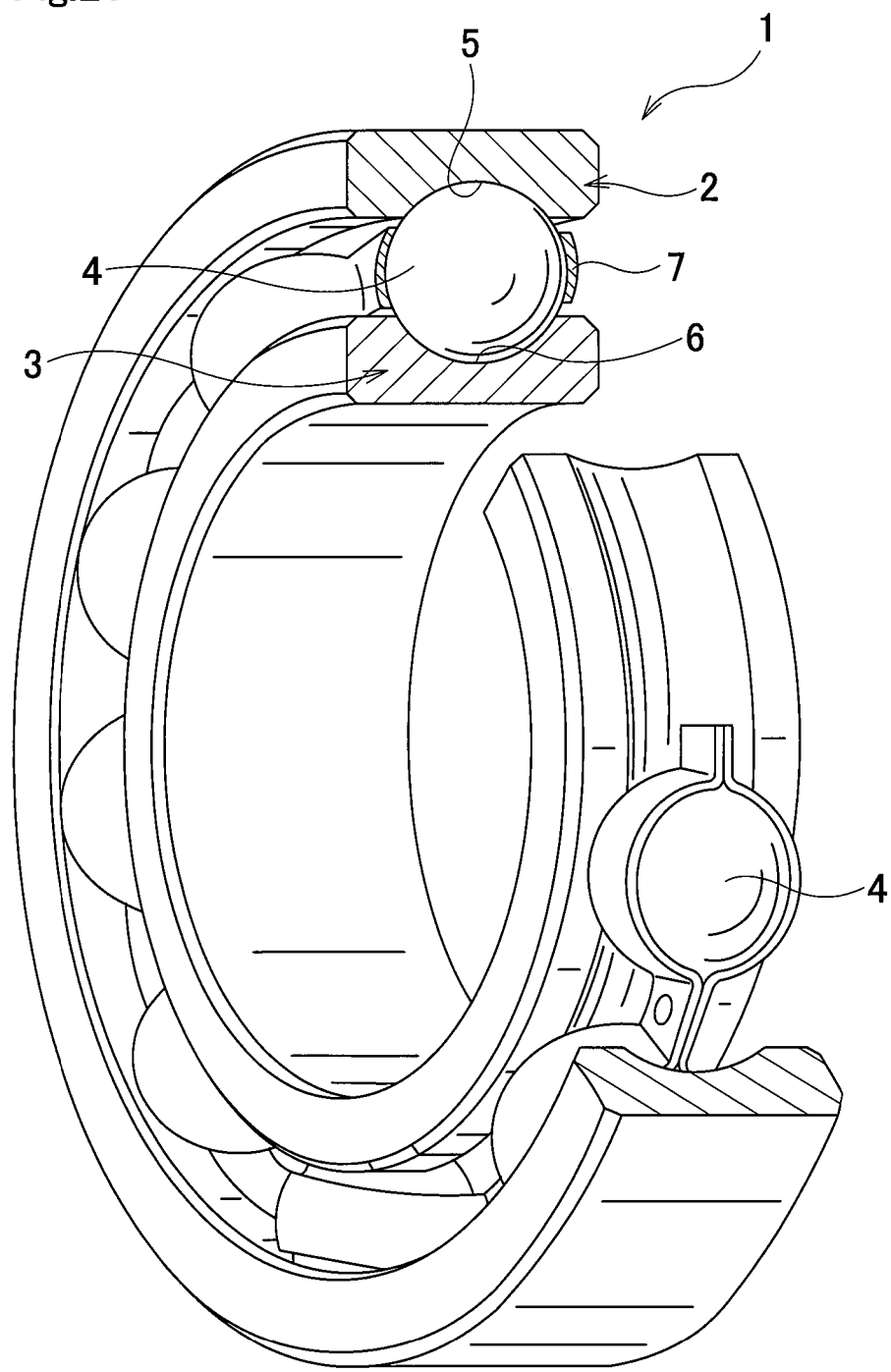
FIG. 21 is a partial perspective view that illustrates an example of a rolling bearing in which an outer ring and an inner ring that are objects of the manufacturing method of the present invention are assembled.

When displacing (pressing) the forming roll 24a further toward the outer-diameter constraining die 36 from the state in which the molding space is filled with the metal blank 26, the internal stress in the metal blank 26 increases and presses the mandrel 23a, the outer-diameter constraining die 36 and the pair of support shaft sections 37a, 37b of the molding space. Of the pressing force by the metal blank 26, when the pressing force that is applied to the end surface on the rolling shaft section 38 side of the other support shaft section 37b exceeds the elastic force of the elastic member 58, the other support shaft section 37b displaces in a direction going away from the rolling shaft section 38 (downward in FIG. 2) against the elastic force of the elastic member 58 as illustrated in FIG. 2. In other words, when the pressing force of the metal blank 26 is less than the elastic force of the elastic member 58, the elastic member 58 functions as a displacement regulating means for preventing the other shaft support section 37b from displacing in a direction away from the rolling shaft section 38. When the other support shaft section 37b displaces in a direction away from the rolling shaft section 38, the other end section in the axial direction of the molding space is released, and excess material 64 (portion illustrated by the diagonal lattice in FIG. 2) of the metal blank 26 is able to be released from that portion. In other words, in this example, the other support shaft section 37b corresponds to excess material evacuation means. After rotating and driving the forming roll 24a for a specified amount of time, or after the forming roll 24a has displaced a specified amount toward the outer-diameter constraining die 36, displacement and rotation of the forming roll 24a stops, and the rolling process ends. The outer ring 2 (see FIG. 21) is obtained by performing a finishing process such as a cutting process, grinding process and the like on the ring-shaped member that is obtained from this kind of rolling process.

As described above, with the manufacturing method and manufacturing apparatus for a ring-shaped member of this example, together with being able to prevent the occurrence of damage to the mandrel 23a, it is also possible to improve the precision of the shape of the ring-shaped member 35 after processing. In other words, in this example, when the other support shaft section 37b of the mandrel 23a receives a specified large pressing force in the axial direction (direction away from the rolling shaft section 38) from the metal blank 26, the other support shaft section 37b is configured so as to be able to displace in a direction going away from the rolling shaft section 38 in the axial direction. Therefore, even when the internal stress in the metal blank 26 in the molding space during processing of the metal blank 26 becomes high, the other support shaft section 37b displaces in a direction going away from the rolling shaft section 38 in the axial direction and releases the other support shaft section 37b side of the molding space, which allows excess material of the metal blank 26 to be released from that portion. As a result, the internal stress in the metal blank 26 in the molding space decreases, so the stress that is applied to the mandrel 23a can be reduced. Moreover, the internal stress in the metal blank 26 during processing can be released, so it is possible to prevent distortion of the metal blank 26 inside the molding space, and prevent the roundness of the ring-shaped member after processing from worsening.

Moreover, in the last stage of processing, it is possible to constrain the outer diameter of the metal blank 26 by the outer-diameter constraining die 36, and constrain one end surface in the axial direction of the metal blank 26 by the end surface on the rolling shaft section 38 side of the one support shaft section 37a. Therefore, a cutting process does not need to be performed on the outer-circumferential surface and one end surface of the ring-shaped member 35 after processing, or even in the case that cutting is performed, only a little processing is necessary. In contrast to this, when there is a large amount of movement of excess material, a cutting process must be performed on the end surface on the other support shaft section 37b side of the ring-shaped member 35. However, when there is no movement or only a little movement of excess material, it is possible to omit the cutting process. In this way, by shortening the cutting process for performing a finishing process on the ring-shaped member 35 after processing or limiting the location where this cutting process is performed, it is possible to improve productivity. Depending on the product, it may also be possible to not perform a finishing process, and to use the ring-shaped member 35 that was manufactured by the manufacturing method of this example as the final product.

Moreover, the mandrel 23a includes a pair of support shaft sections 37a, 37b that are each provided separately, and a rolling shaft section 38, so when the rolling shaft section 38 becomes damaged, only the rolling shaft section 38 need to be replaced. Therefore, it is possible to keep down repair costs. Both end sections in the axial direction of the rolling shaft section 38, which has a short axial-direction dimension, are supported by the pair of highly rigid support shaft sections 37a, 37b, so it is possible to bring the positions where the rolling shaft section 38 are supported close to the metal blank 26, and to reduce bending stress that is applied to the rolling shaft section 38 and the pair of support shaft sections 37a, 37b from the metal blank 26. As a result, the durability of the mandrel 23a can be improved.

Moreover, in this example, by performing the rolling process, it is possible to simultaneously finish the outer-circumferential surface and inner-circumferential surface of the ring-shaped member 35 and the end surface on the on support shaft section 37a side. Therefore, it is possible to improve the precision of axial-direction distance from the end surface on the one support shaft section 37a side of the ring-shaped member 35 to the outer-ring raceway and seal-ring locking groove. As a result, there is no need for a cutting process as preparation for a grinding process that is performed with the end surfaces in the axial direction of the ring-shaped member as a reference, or even in the case that a cutting process is performed, the cutting process can be simply performed.

The manufacturing apparatus 21a for a ring-shaped member of this example employs construction in which the support roll 25a is not displaced in the horizontal direction, and only the forming roll 24a is displaced in the horizontal direction (mandrel 23a side) during processing. However, construction can also be such that the forming roll is not displaced in the horizontal direction, and only the support roll is displaced in the horizontal direction (mandrel side). Moreover, construction can also be employed in which both the support roll and the forming roll are displaced in the horizontal direction.

Second Example

Figure 3:
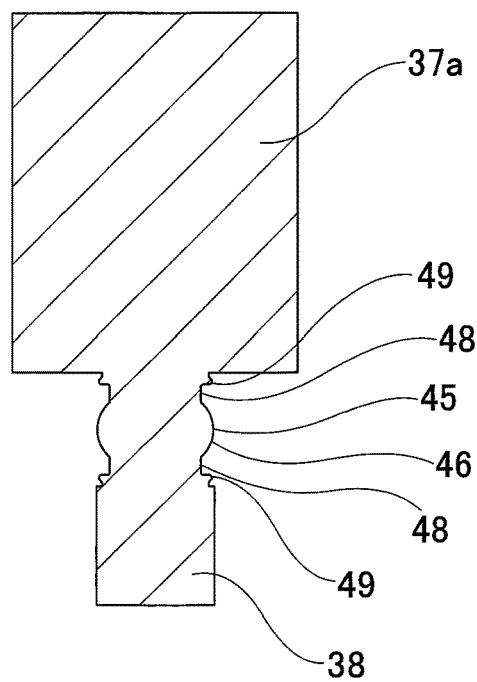
FIG. 3 is a cross-sectional view of part of a mandrel of a second example of an embodiment of the present invention.

FIG. 3 illustrates a second example of an embodiment of the present invention. The manufacturing apparatus for a ring-shaped member of this example is such that the one support shaft section 37a of the mandrel and the rolling shaft section 38 are integrally formed. The other construction and functions are the same as in the first example of an embodiment.

Third Example

Figure 4:
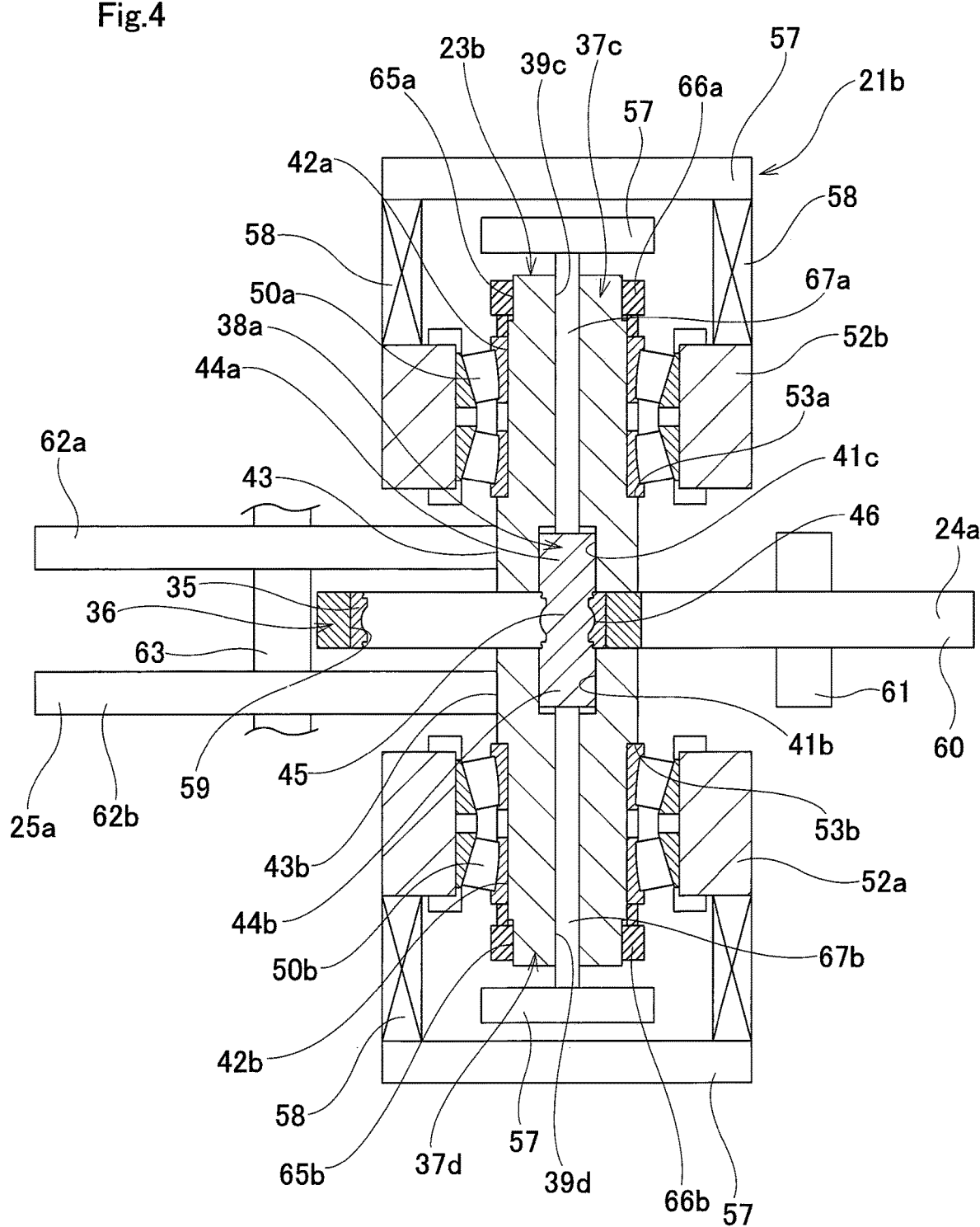
FIG. 4 is a cross-sectional view similar to FIG. 1, and illustrates a third example of an embodiment of the present invention.

FIG. 4 illustrates a third example of an embodiment of the present invention. The manufacturing apparatus 21b for a ring-shaped member of this example is such that a mandrel 23b is constructed by a pair of support shaft sections 37c, 37d and a rolling shaft section 38a. In this example, of the center hole 39c in one support shaft section 37c of the pair of support shaft sections 37c, 37d, the inner-diameter dimension of a fitting hole 41c that is formed in a portion near the other end in the axial direction is made to be a little larger than the outer-diameter dimension of one fitting section 44a of the rolling shaft section 38a. The one support shaft section 37c is such that a male threaded section 65a is formed in a portion near one end in the axial direction of a small-diameter cylindrical section 42a that is formed on half of one side in the axial direction of the outer-circumferential surface. The tip-end section (other end section in the axial direction) of a nut shaped constraining member 66a that is screwed onto this male threaded section 65a is brought into contact with one end surface in the axial direction of an inner ring of a radial tapered roller bearing 50a. The surface of the other end in the axial direction of the inner ring of the radial tapered roller bearing 50a comes in contact with a stepped section 53a that connects the other end section in the axial direction of the small-diameter cylindrical section 42a and the one end section in the axial direction of a mandrel-side regulating surface 43a. A threaded hole is not formed in a portion near the one end in the axial direction of the center hole 39c in the one support shaft section 37c.

The one support shaft section 37c is supported by a displaceable support section 52b by way of the radial tapered roller bearing 50a so as to be able to rotate. A mechanical type such as a spring, a hydraulic type, a gas pressure type or a pneumatic type elastic member 58 is provided between the displaceable support section 52b and a fixed portion 57 such as a cradle. This elastic member 58 elastically presses the one support shaft section 37c toward the rolling shaft section 38a (downward in FIG. 4). The one support shaft section 37c is able to displace in the axial direction with respect to the rolling shaft section 38a. The elastic force of the elastic member 58 (force by which the one support shaft section 37c is pressed) is appropriately set as in the case of the first example of an embodiment. In this example, the elastic force of the elastic member 58 that presses the one support shaft section 37c is the same as the elastic force of an elastic member 58 that presses the support shaft section 37d that will be described later. In this example, the elastic member 58 that presses the one support shaft section 37c and the elastic member 58 that presses the other support shaft section 37d both correspond to energizing means.

Of the pair of support shaft sections 37c, 37d, the other support shaft section 37d has a symmetrical shape in the up-down direction in FIG. 4 with respect to the one support shaft section 37c. A male threaded section 65b is formed on a portion near the other end in the axial direction of the small-diameter cylindrical section 42b that is formed on half of the other side in the axial direction of the outer-circumferential surface of the other support shaft section 37d. The tip-end section (the one end section in the axial direction) of a nut shaped constraining member 66b that is screwed onto the male threaded section 65b is brought into contact with the other end surface in the axial direction of an inner ring of a radial tapered roller bearing 50b. The one end surface in the axial direction of the inner ring of the radial tapered roller bearing 50b comes in with a stepped section 53b that connects the one end section in the axial direction of the small-diameter cylindrical section 42b and the other end section in the axial direction of a mandrel-side regulating surface 43b. A threaded hole is not formed in the portion near the other end in the axial direction of the center hole 39d in the other support shaft section 37d. The other construction and form of support of the other support shaft section 37d is the same as in the first example of an embodiment.

The rolling shaft section 38a is such that a pair of connecting shaft sections 67a, 67b are provided in the center section of both end surfaces in the axial direction so as to extend in the axial direction from both end surfaces in the axial direction. The pair of connecting shaft sections 67a, 67b are inserted into the center holes 39c, 39d in the pair of support shaft sections 37c, 37d, and the tip-end sections thereof are fastened to and supported by fixed portions 57. As a result, it is possible to position the rolling shaft section 38 in the axial direction.

With this example, when the molding space is filled with the metal blank 26 and the pressing force in the axial direction that is applied to the pair of support shaft sections 37c, 37d from the metal blank 26 exceeds a specified value, the pair of support shaft sections 37c, 37d displace against the elastic force of the elastic members 58 in a direction in the axial direction going away from the rolling shaft section 38. Therefore, both end sections in the axial direction of the molding space are released and excess material 64 of the metal blank 26 is able to be released from these portions. The other construction and functions are the same as in the first example of an embodiment.

Fourth Example

Figure 5:
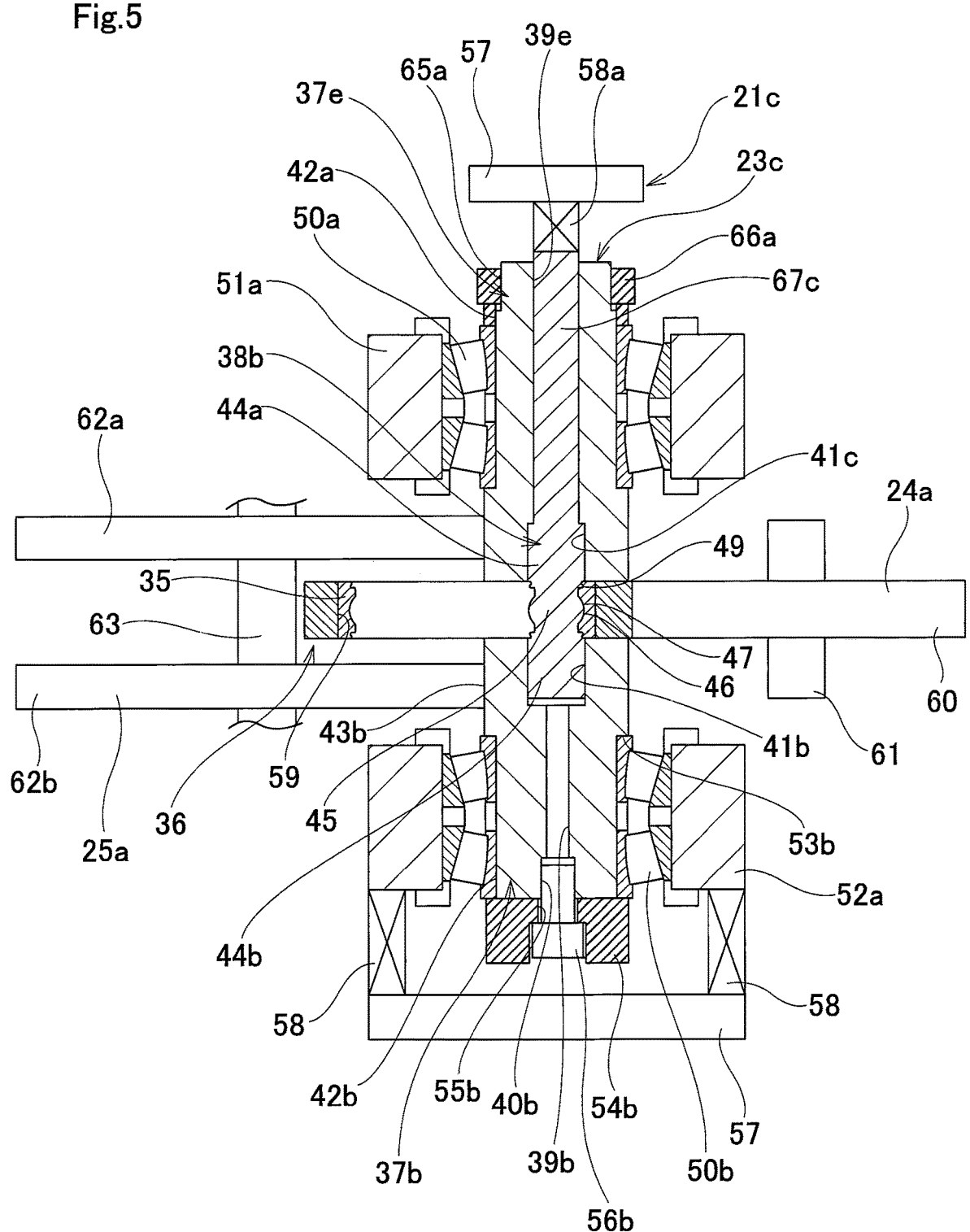
FIG. 5 is a cross-sectional view similar to FIG. 1, and illustrates a fourth example of an embodiment of the present invention.

FIG. 5 illustrates a fourth example of an embodiment of the present invention. The manufacturing apparatus 21c for a ring-shaped member of this example is such that of a center hole 39e in one of the support shaft sections 37e of a pair of support shaft sections 37e, 37b of a mandrel 23c, the inner diameter of a portion other than a fitting hole 41c that is provided in the other end section in the axial direction is larger than in the first example of an embodiment. As in the second example of an embodiment, the inner-diameter dimension of the fitting hole 41c is a little larger than the outer diameter of the one fitting section 44a of the rolling shaft section 38b. In addition, the construction of the one support shaft section 37e is the same as the construction in the second example of an embodiment, and the form of support is the same as in the first example of an embodiment. The construction and form of support of the other support shaft section 37b of the pair of support shaft sections 37e, 37b are the same as in the first example of an embodiment.

A connecting shaft section 67c having a diameter that is smaller than that of the one fitting section 44a of the rolling shaft section 38b is provided on the one end surface in the axial direction of the rolling shaft section 38b so as to extend in the one direction in the axial direction from that end surface. The connecting shaft section 67c is inserted through the center hole 39e in the one support shaft section 37e and is supported by a fixed portion 57 by way of a mechanical type (such as a spring), a hydraulic type, a gas pressure type or a pneumatic type elastic member 58a. The elastic member 58a applies an elastic force to the rolling shaft section 38b in a direction toward the one support shaft section 37e (upward in FIG. 5). With an elastic force applied to the elastic member 58a, displacement of the rolling shaft section 38b toward the one side in the axial direction is regulated by engagement (contact) between the one end surface in the axial direction of the one fitting section 44a and the bottom section of the fitting hole 41c in the one support shaft section 37e. Therefore, when a strong pressing force in a specified axial direction (direction away from the one support shaft section 37e) is applied to the rolling shaft section 38b, the rolling shaft section 38b is able to displace against the elastic force of the elastic member 58a in a direction going away from the one support shaft section 37e (downward in FIG. 5).

With the manufacturing apparatus 21c for a ring-shaped member of this example, it is possible for the metal blank 26 to flow in the axial direction with good balance during the rolling process. In other words, uneven sections such as a raceway forming section 47 and groove forming section 49 are formed in the rolling shaft section 38b. Therefore, due to the engagement between these uneven sections and the metal blank 26 (see FIG. 1), there is a possibility that the flow of the metal blank 26 inside the molding space from the one support shaft section 37e side toward the other support shaft section 37b side will not be performed smoothly. In this example, the rolling shaft section 38b is supported so that displacement in the other direction in the axial direction with respect to the one support shaft section 37e is possible, so when a pressing force is applied to the rotating shaft section 38b in a direction going away from the one support shaft section 37e due to engagement between the uneven sections of the rolling shaft section 38b and the metal blank 26, the rolling shaft section 38b displaces in the other direction in the axial direction together with the metal blank 26. As a result, it is possible for the metal blank 26 to smoothly flow from the one support shaft section 37e side to the other support shaft section 37b side. Therefore, it is possible to obtain a high-quality ring-shaped member 35 having good balance in the axial direction. The other construction and functions are the same as in the first example of an embodiment.

Fifth Example

Figure 6:
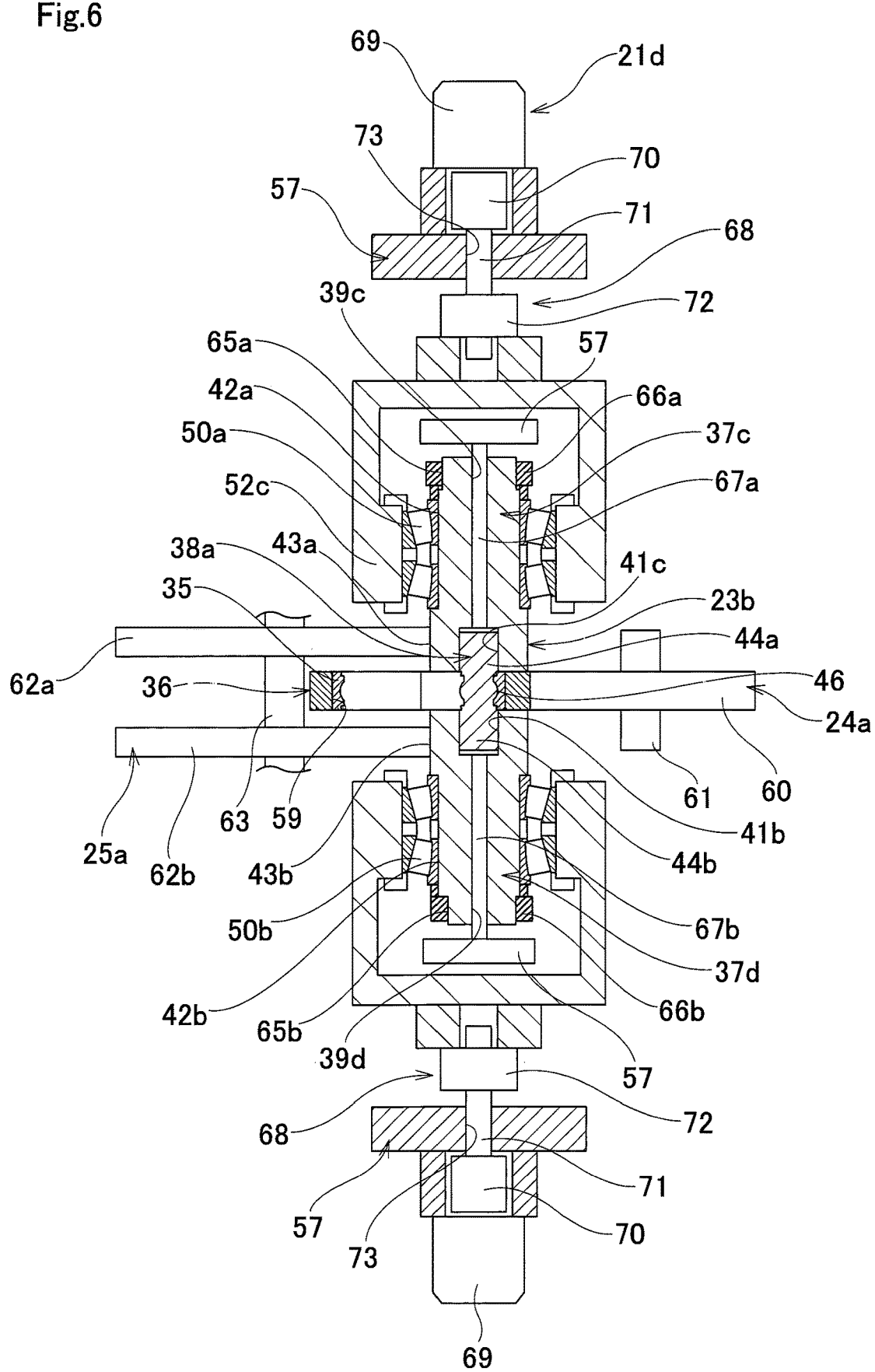
FIG. 6 is a cross-sectional view similar to FIG. 1, and illustrates a fifth example of an embodiment of the present invention.
Figure 7:
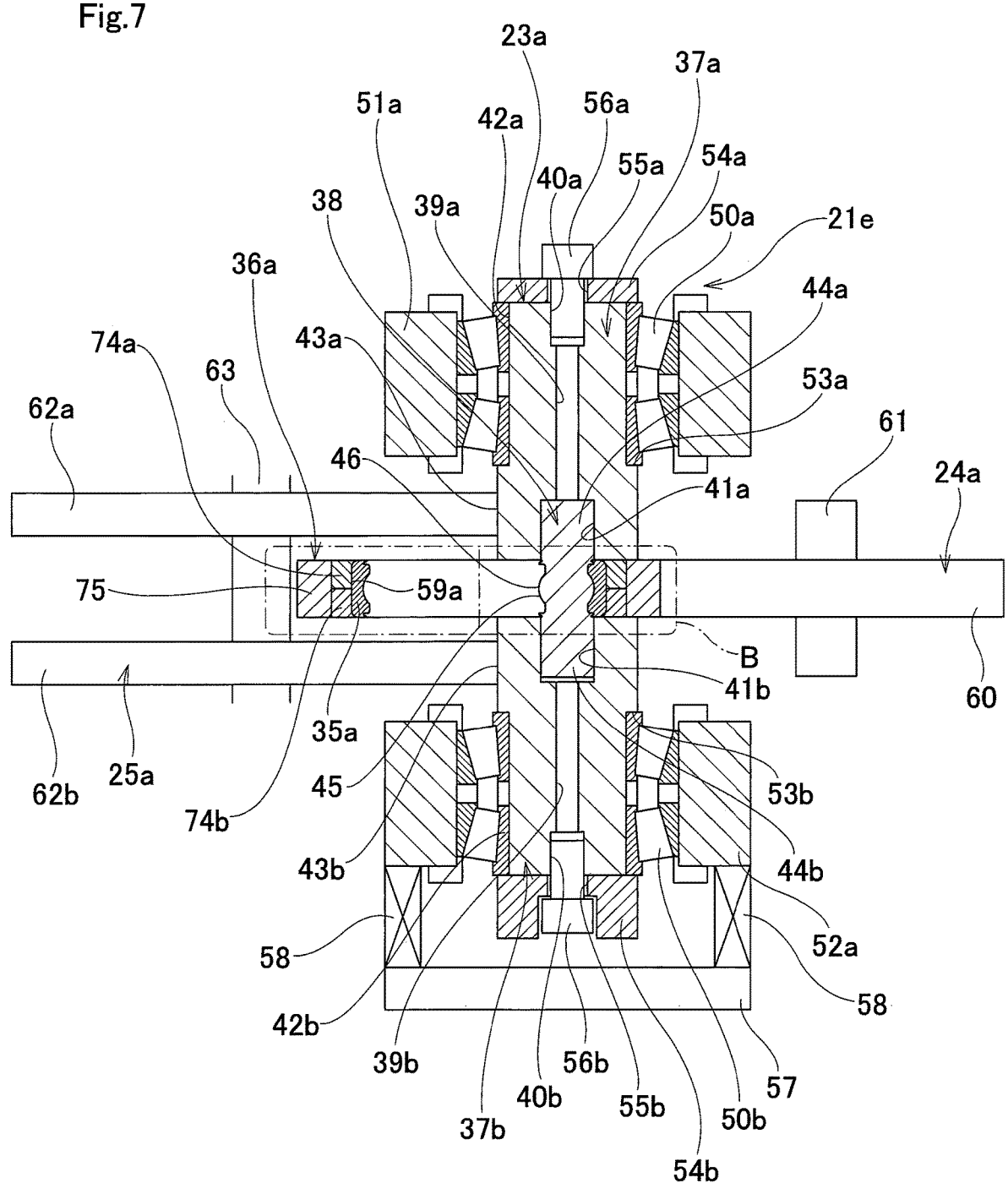
FIG. 7 is a cross-sectional view similar to FIG. 1, and illustrates a sixth example of an embodiment of the present invention.
Figure 8:
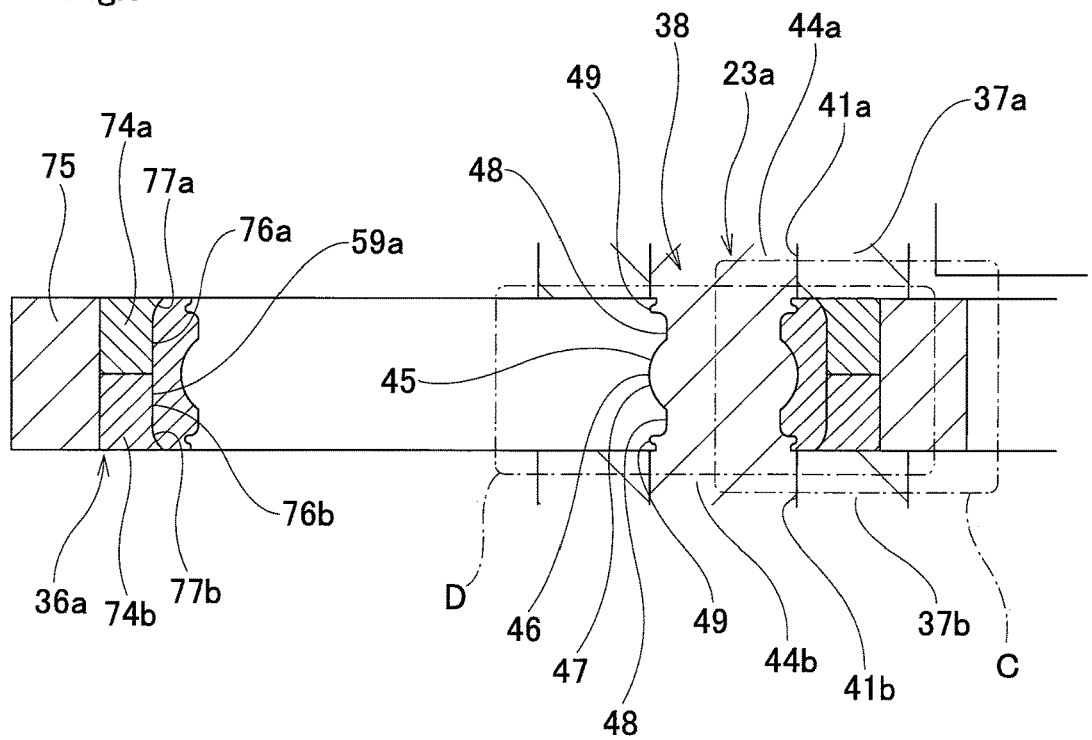
FIG. 8 is an enlarged cross-sectional view that corresponds to B in FIG. 7.

FIG. 6 illustrates a fifth example of an embodiment. The manufacturing apparatus 21d for a ring-shaped member of this example is configured such that each of the pair of support shaft sections 37c, 37d of the mandrel 23b is able to displace in the axial direction by way of a feed screw mechanism 68. The construction and form of support of the pair of support shaft sections 37c, 37d is symmetrical in the up-down direction of FIG. 6 for each of the pair of support shaft sections 37c, 37d. Therefore, the construction and form of support will be explained for only one (top one) support shaft section 37c.

The mandrel 23b has the same construction as in the third example of an embodiment. The one support shaft section 37c of the pair of support shaft sections 37c, 37d of the mandrel 23b is rotatably supported by way of a radial tapered roller bearing 50a with respect to a displaceable support section 52c. The displaceable support section 52c has a cross-sectional shape on an imaginary plane that passes through the center axis of the mandrel 23b that is a U-shaped cylindrical shape with a bottom that is open on the rolling shaft section 38a side (bottom in FIG. 6). The displaceable support section 52c is supported by way of a feed screw mechanism 68 so as to be able displace in the axial direction with respect to a fixed portion 57.

The feed screw mechanism 68 includes a servo motor 69, a reducer 70, a ball screw 71, and a nut 72. Of both side surfaces in the axial direction of a fixed portion 57 that is on the outside of the displaceable support section 52c, the servo motor 69 is fastened to the opposite side surface from the rolling shaft section 38a. The reducer 70 is provided between the output shaft (not illustrated in the figure) of the servo motor 69 and the ball screw 71. The ball screw 71 is such that with one end section connected to the reducer 70 and the middle section in the axial direction inserted through a through hole 73 in the fixed portion 57, the other half section in the axial direction protrudes from the side surface on the rolling shaft section 38a side of both side surfaces in the axial direction of the fixed portion 57. The nut 72, when screwed onto the portion near the other end in the axial direction of the ball screw 71, is supported by and fastened to the opposite side surface from the rolling shaft section 38a (top surface in FIG. 6) of the bottom section of the displaceable support section 52c. The feed screw mechanism 68, based on the driving of the servo motor 69, is able to make the displaceable support section 52c and the one support shaft section 37c displace in the axial direction.

In this example, the pair of support shaft sections 37c, 37d are made to displace in a direction away from the rolling shaft section 38a by simultaneously driving the pair of servo motors 69 only when the torque that is applied to the servo motor 69 that is provided on the one support shaft section 37c side (pressing force in the axial direction that is applied to the one support shaft section 37c from the metal blank 26) and the torque that is applied to the servo motor 69 that is provided on the other support shaft section 37d side (pressing force in the axial direction that is applied to the other support shaft 37d section from the metal blank 26) exceed a specified value. Therefore, in a state in which the metal blank 26 is plastically deformed so that the axial-direction dimension becomes large, when only the one end surface in the axial direction of the metal blank 26 comes in contact with the end surface on the rolling shaft section 38a side of the one support shaft section 37c, and just the torque that is applied to the servo motor 69 that is provided on this one support shaft section 37c side is increased, or conversely when just the torque that is applied to the servo motor 69 that is provided on the other support shaft section 37d side is increased, the pair of servo motors 69 are regulated so as not to be driven.

With the method of using the manufacturing apparatus 21d for a ring-shaped member of this example, when the forming roll 24a is displaced (pressed) further toward the outer-diameter constraining die 36 from the state in which the molding space that is formed between the first rolling surface 46 of the mandrel 23b, the second rolling surface 59 of the outer-diameter constraining die 36, and the end surfaces of the pair of support shaft sections 37c, 37d that face each other is filled with the metal blank 26, the internal stress inside the metal blank 26 increases. The metal blank 26 then presses the mandrel 23b, the outer-diameter constraining die 36 and the pair of support shaft sections 37c, 37d that form the molding space. Of the pressing forces by the metal blank 26, when the pressing forces in the axial direction that are applied to the pair of support shaft sections 37c, 37d, or in other words, the torques that are applied to the pair of servo motors 69 exceed a specified value, the pair of servo motors 69 drive and cause the pair of support shaft sections 37c, 37d to displace in a direction away from the rolling shaft section 38a. As a result, both end sections in the axial direction of the molding space are released, and excess material of the metal blank 26 is able to be released from these portions. The process described above can be repeated as many times as necessary until the desired shape of the ring-shaped member is obtained. The other construction and functions are the same as in the third example of an embodiment. The construction of the feed screw mechanism for causing the displaceable support section to displace in the axial direction is not limited to the construction described above. Moreover, the pair of servo motors 69 could also be made common by using one servo motor.

It is also possible to employ construction in which, of the support shaft sections 37c, 37d of the mandrel 23b, displacement in the axial direction of the one support shaft section 37c is regulated and only the other support shaft section 37d is displaced in the axial direction by the feed screw mechanism 68. In other words, in the construction of the first example of an embodiment, it is possible to use construction of using a feed screw mechanism 68 instead of construction of supporting the other support shaft section so that displacement in the axial direction is possible. The other construction and functions are the same as in the first example of an embodiment.

Sixth Example

FIG. 7 to FIG. 10B illustrate a sixth example of an embodiment of the present invention. The manufacturing apparatus 21e for a ring-shaped member of this example includes a mandrel 23a, an outer-diameter constraining die 36a, a forming roll 24a and a support roll 25a. The outer-diameter constraining die 36a includes a pair of outer-diameter constraining die elements 74a, 74b that are arranged side by side in the axial direction and an outer-circumference holding member 75 that is arranged on the outer-diameter side of the pair of outer-diameter constraining die elements 74a, 74b. Each of the pair of outer-diameter constraining die elements 74a, 74b is an annular shaped member that is made of a metal such as die steel, high-speed steel, cemented carbide or the like. Of the pair of outer-diameter constraining die elements 74a, 74b, the outer circumferential surface of one (top one in FIG. 7) outer-diameter constraining die element 74a has a cylindrical surface shape of which the outer diameter does not change in the axial direction. The inner-circumferential surface of the one outer-diameter constraining die element 74a includes a cylindrical surface section 76a and a curved surface section 77a. The cylindrical surface section 76a is such that of the inner-circumferential surface of the one outer-diameter constraining die element 74a the surface from the portion near one end in the axial direction to the edge on the other end in the axial direction is a formed into a cylindrical surface shape of which the inner diameter does not change in the axial direction. The curved surface section 77a is formed on one end section in the axial direction of the inner-circumferential surface of the one outer-diameter constraining die element 74a so that the cross-sectional shape is a curved surface shape of which the inner diameter becomes smaller going in one direction in the axial direction. The edge on the one end in the axial direction of the cylindrical surface section 76a and the edge on the other end in the axial direction of the curved surface section 77a are smoothly continuous.

Of the pair of outer-diameter constraining die elements 74a, 74b, the outer-circumferential surface of the other (bottom one in FIG. 7) outer-diameter constraining die element 74b has a cylindrical surface shape of which the outer diameter does not change in the axial direction. The inner-circumferential surface of the other outer-diameter constraining die element 74b includes a cylindrical surface section 76b and a curved surface section 77b. The cylindrical surface section 76b is such that of the inner-circumferential surface of the other outer-diameter constraining die element 74b the surface from the portion near the other end in the axial direction to the edge on the one end in the axial direction is a formed into a cylindrical surface shape of which the inner diameter does not change in the axial direction. The curved surface section 77b is formed on the other end section in the axial direction of the inner-circumferential surface of the other outer-diameter constraining die element 74b so that the cross-sectional shape is a curved surface shape of which the inner diameter becomes smaller going in the other direction in the axial direction. The edge on the other end in the axial direction of the cylindrical surface section 76b and the edge on the one end in the axial direction of the curved surface section 77b are smoothly continuous. In other words, the outer diameter pair of constraining die elements 74a, 74b are formed into a symmetrical shape on an imaginary plane that is orthogonal to the axial direction.

The pair of outer-diameter constraining die elements 74a, 74b are arranged side-by-side in the axial direction, and the inner-circumferential surfaces of this pair of outer-diameter constraining die elements 74a, 74b form the second rolling surface 59a for performing a rolling process on the outer-circumferential surface of the metal blank 26. In other words, in a state in which the pair of outer-diameter constraining die elements 74a, 74b are arranged with no space in between in the axial direction, the second rolling surface 59a is such that one end section in the axial direction includes the curved surface section 77a of the one outer-diameter constraining die element 74a, the other end section in the axial direction includes the curved surface section 77b of the other outer-diameter constraining die element 74b, and the middle section in the axial direction, which is the portion between both end sections in the axial direction, includes the cylindrical surface sections 76a, 76b of the pair of outer-diameter constraining die elements 74a, 74b.

The outer-circumference holding member 75 is an annular shaped member that is made of a metal such as die steel, high-speed steel, cemented carbide, or the like. The outer-circumferential surface of the outer-circumference holding member 75 has a cylindrical surface shape of which the inner diameter does not change in the axial direction. The axial-direction dimension of the outer-circumference holding member 75 is double the axial-direction dimension $H_1$ of each of the pair of outer-diameter constraining die elements 74a, 74b (see FIG. 14). In other words, the axial-direction dimension $H_1 \times 2$ in a state in which there is no space in the axial direction between the pair of outer-diameter constraining die elements 74a, 74b is equal to the axial-direction dimension of the outer-circumference holding member 75. The outer-circumference holding member 75 is fitted around the outer-circumferential surfaces of the pair of outer-diameter constraining die elements 74a, 74b in a state in which the pair of outer-diameter constraining die elements 74a, 74b are allowed to displace in the axial direction with respect to the outer-circumference holding member 75.

The outer-diameter constraining die 36a is arranged in a state in which the rolling shaft section 38 of the mandrel 23a is inserted through the inner side in the radial direction, and the second rolling surface 59a is made to face the first rolling surface 46. The one end surface in the axial direction of the one outer-diameter constraining die element 74a and part of the one end surface in the axial direction from the portion near the inside end in the radial direction to the edge of the inside end in the radial direction of the outer-circumference holding member 75 come in contact with the other end surface in the axial direction of the one support shaft section 37a. The other end surface in the axial direction of the other outer-diameter constraining die element 74b and part of the other end surface from the portion near the inside end in the radial direction of the other end surface in the axial direction to the edge of the inside end in the radial direction of the outer-circumference holding member 75 come in contact with the one end surface in the axial direction of the other support shaft section 37b. As a result, the pair of outer-diameter constraining die elements 74a, 74b of the outer-diameter constraining die 36a and the outer-circumference holding member 75 can be positioned in the axial direction. In this state, the center axis of the outer-diameter constraining die 36a and the center axis of the mandrel 23a are parallel. Except for the construction of the outer-diameter constraining die 36a, the construction of the manufacturing apparatus 21e for a ring-shaped member is the same as the construction in the first example of an embodiment.

The procedure for manufacturing a ring-shaped member 35a by performing a rolling process on the metal blank 26 using the manufacturing apparatus 21e for a ring-shaped member of this example is basically the same as the procedure for manufacturing a ring-shaped member 35a using the manufacturing apparatus 21a for a ring-shaped member of the first example of an embodiment described above.

Figure 9:
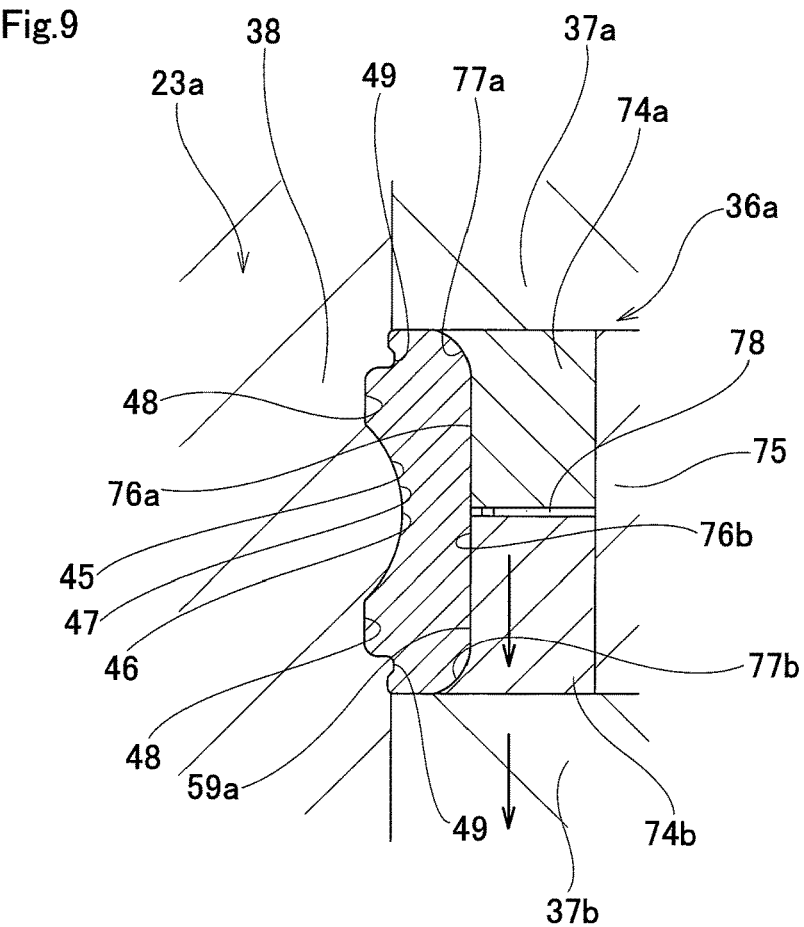
FIG. 9 is an enlarged cross-sectional view that corresponds to C in FIG. 8.

In the method of using the manufacturing apparatus 21e for a ring-shaped member of this example, when the forming roll 24a is displaced (pressed) further toward the outer-diameter constraining die 36a (outer-circumference restraining member 75) from the state in which the metal blank 26 is filled into the molding space defined by the first rolling surface 46 of the mandrel 23a, the second rolling surface 59a of the outer-diameter constraining die 36a, and the end surfaces on the rolling shaft section 38 side of the pair of support shaft sections 37a, 37b, the internal stress in the metal blank 26 increases. The metal blank 26 then presses the mandrel 23a, the outer-diameter constraining die 36a and the pair of support shaft sections 37a, 37b that form the molding space. Of the pressing forces of the metal blank 26, when the pressing force that is applied to the end surface on the rolling shaft section 38 side of the other support shaft section 37b exceeds the elastic force of the elastic member 58, the other support shaft section 37b, as illustrated in FIG. 9, displaces in a direction away from the rolling shaft section 38 (downward in FIG. 7 to FIG. 9) against the elastic force of the elastic member 58. Moreover, from the engagement between the curved sections 77a, 77b of the pair of outer-diameter constraining die elements 74a, 74b and both end sections in the axial direction of the outer-circumferential surface of the metal blank 26, pressing forces in the axial direction are applied to the pair of outer-diameter constraining die elements 74a, 74b in directions separating the pair of outer-diameter constraining elements 74a, 74b. The one outer-diameter constraining die elements 74a of the pair of outer-diameter constraining die elements 74a, 74b is such that displacement in the axial direction is regulated by the other end surface in the axial direction of the one support shaft section 37a, so does not displace. However, the other outer-diameter constraining die element 74b of the pair of outer-diameter constraining die elements 74a, 74b displaces in a direction away from the rolling shaft section 38 (downward in FIG. 7 to FIG. 9) due to the displacement of the other support shaft section 37b. As the other outer-diameter constraining die element 74b displaces, an axial-direction gap 78 is formed between the other end surface in the axial direction of the one outer-diameter constraining die element 74a and the one end surface in the axial direction of the other outer-diameter constraining die element 74b. In this way, the other end section in the axial direction of the molding space and the portion of the axial-direction gap 78 are released, and the excess material of the metal blank 26 can be released from these portions.

With the manufacturing apparatus 21e for a ring-shaped member of this example, the outer-diameter constraining die 36a is constructed by a pair of outer-diameter constraining die elements 74a, 74b that are arranged side-by-side in the axial direction, so when the outer-diameter constraining die 36a receives a specified pressing force in the axial direction from the metal blank 26, the other outer-diameter constraining die elements 74b of the outer-diameter constraining die elements 74a, 74b can displace in the other direction in the axial direction. As a result, even when pressing forces in the axial direction are applied to the outer-diameter constraining die elements 74a, 74b of the outer-diameter constraining die 36a as the internal stress inside the metal blank 26 inside the molding space increases during processing, it is possible to prevent damage such as cracking due to tensile stress from occurring in the outer-diameter constraining die 36a. Moreover, it is possible for excess material of the metal blank 26 to be released from the axial-direction gap 78 that is formed in the portion between the outer-diameter constraining die elements 74a, 74b by the pair of outer-diameter constraining die elements 74a, 74b displacing in directions in the axial direction away from each other. A convex section may be formed in the center section in the axial direction of the outer-circumferential surface of the ring-shaped member after processing due to excess material of the metal blank 26 escaping into the axial-direction gap 78. In that case, a trimming process is performed after the rolling process. However, this trimming process can be performed using small equipment, so the processing cost does not become needlessly high. When the convex section that is formed by excess material is small, processing can move on as is to a finishing process, and the convex section can be ground away in the finishing process.

An R section that is formed in the connecting section between the other end section in the axial direction of the outer-circumferential surface and the other end surface in the axial direction of the ring-shaped member 35a that is made using the manufacturing apparatus 21e for a ring-shaped member of this example is such that the dimensional tolerance that is allowed when compared with other portions is large, so even when the shape of the R section changes a little by the other outer-diameter constraining die element 74b displacing in the other direction in the axial direction, it is possible to omit a cutting process. The other construction and functional effects are the same as in the first example of an embodiment.

Seventh Example

Figure 10:
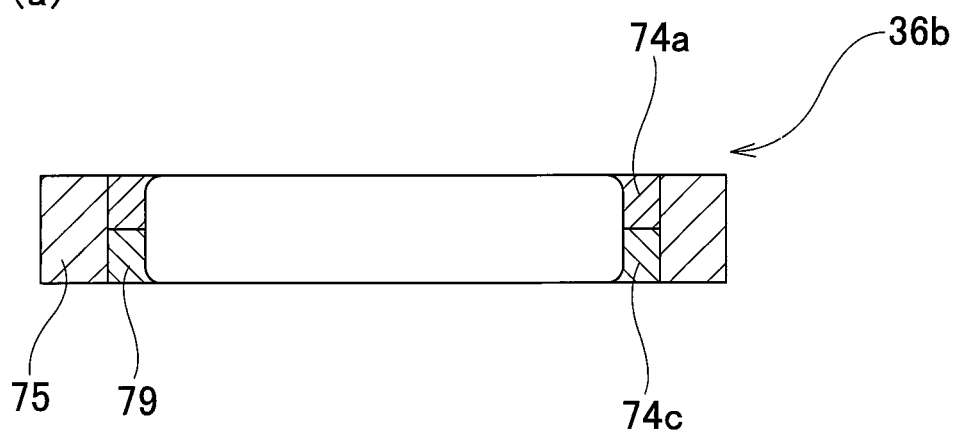
FIG. 10A is a cross-sectional view illustrating an outer-diameter constraining die of a seventh example of an embodiment of the present invention.
FIG. 10B is a side view as seen from below in FIG. 10A of this outer-diameter constraining die.
Figure 10:
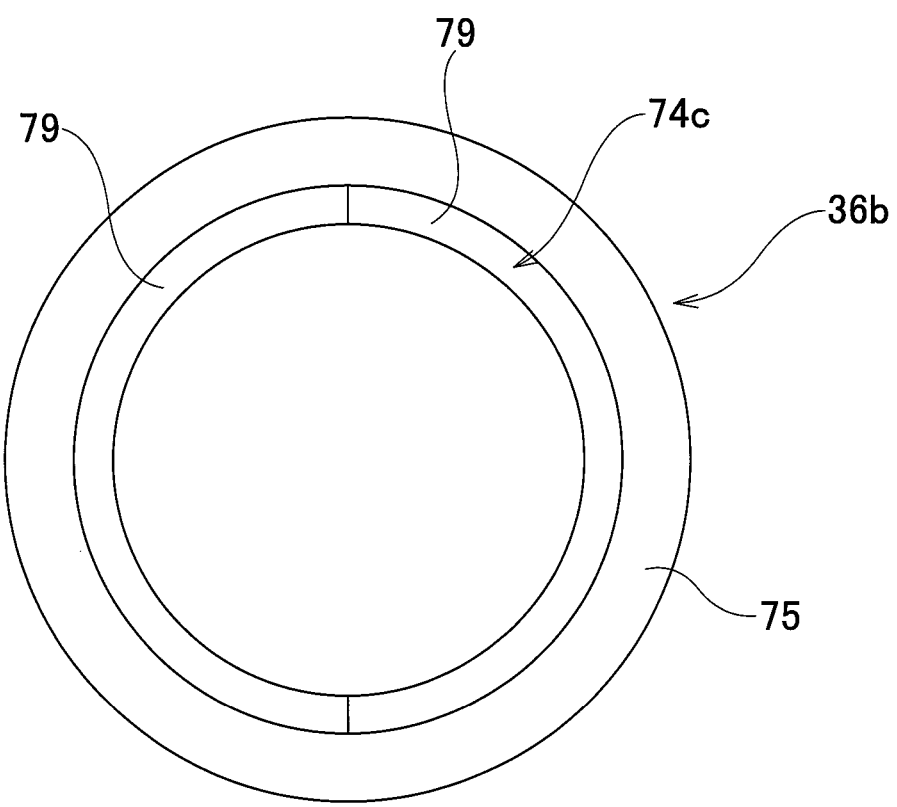

FIG. 10 illustrates a seventh example of an embodiment of the present invention. The manufacturing apparatus for a ring-shaped member of this example is such that the other outer-diameter constraining die element 74c (bottom one in FIG. 10A) of the pair of outer-diameter constraining die elements 74a, 74c of the outer-diameter constraining die 36b is constructed so that the other outer-diameter constraining die element 74b of the sixth example of an embodiment is divided into two parts in the circumferential direction. In other words, the other outer-diameter constraining die element 74c includes a pair of semi-ring-shaped members 79 that are arranged side-by-side without being continuous in the circumferential direction (the end surfaces in the circumferential direction of each are abutted against each other). The one outer-diameter constraining die element 74a has the same construction as the one outer-diameter constraining die element 74a in the six example of an embodiment. However, the one outer-diameter constraining die element 74a, as in the case of the other outer-diameter constraining die element 74c, can be constructed so as to be divided into two parts in the circumferential direction. The pair of semi-ring-shaped members 79 can also be constructed so as to be connected by a connecting means such as engagement between the end surfaces in the circumferential direction. In that case, preferably construction is such that the engagement of the pair of semi-ring-shaped members 79 can be easily disengaged.

With this embodiment, in the state after the pair of outer-diameter constraining die elements 74a, 74c and the ring-shaped member 35a (see FIG. 7) have been extracted from the inner-diameter side of the outer-circumference holding member 75 after processing, first, the other outer-diameter constraining die element 74c can be easily removed from the ring-shaped member 35a. After that, it is possible to easily perform the work of removing the ring-shaped member 35a from the inner side of the one outer-diameter constraining die element 74a. The other construction and functional effects are the same as in the sixth example of an embodiment.

Eighth Example

Figure 11:
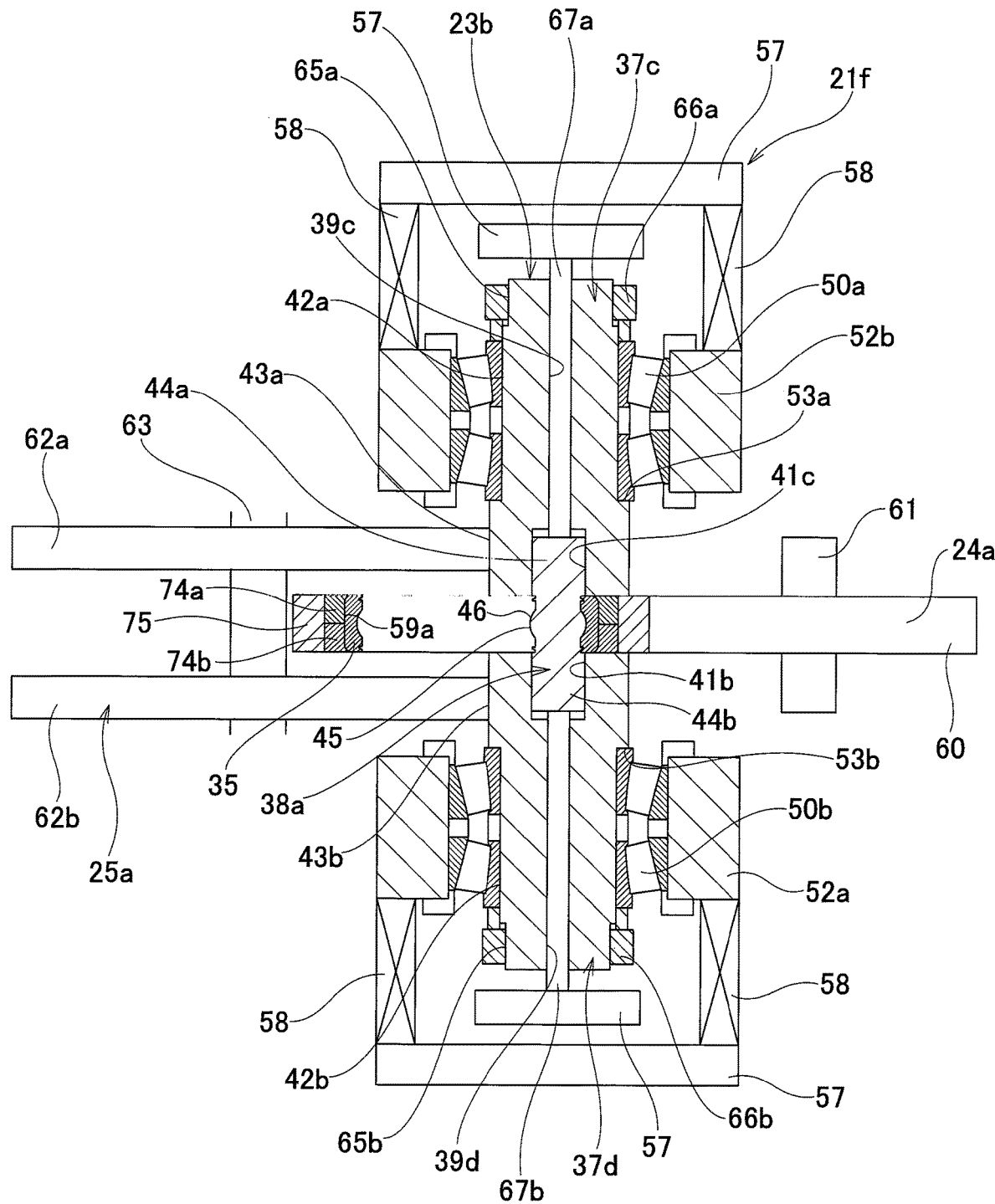
FIG. 11 is a cross-sectional view similar to FIG. 1, and illustrates an eighth example of an embodiment of the present invention.

FIG. 11 illustrates an eighth example of an embodiment of the present invention. The manufacturing apparatus 21f for a ring-shaped member of this example has construction that combines the construction of the third example of an embodiment with the construction of the seventh example of an embodiment. In other words, of the center hole 39c of the one support shaft section 37c of the pair of support shaft sections 37c, 37d, the inner-diameter dimension of a fitting hole 41c that is formed in the other end section in the axial direction is made to be a little larger than the outer-diameter dimension of the one fitting section 44a of the rolling shaft section 38a. The one support shaft section 37c is rotatably supported by a displaceable support section 52b by way of a radial tapered roller bearing 50a. A mechanical type (such as a spring or the like), a hydraulic type, a gas pressure type or a pneumatic type elastic member 58 is provided between the displaceable support section 52b and a fixed portion 57 such as a cradle. The elastic member 58 elastically presses the one support shaft section 37c toward the rolling shaft section 38a. The one support shaft section 37c is able to displace in the axial direction with respect to the rolling shaft section 38a. In this example, the elastic force of the elastic member 58 that presses the one support shaft section 37c and an elastic force (that will be described later) of the elastic member 58 that presses the other support shaft section 37d are taken to be the same.

The outer-diameter constraining die 36a includes a pair of outer-diameter constraining die elements 74a, 74b, and an outer-circumference holding member 75. However, it is also possible to use the outer-diameter constraining die 36b of the seventh example of an embodiment as the outer-diameter constraining die.

With the manufacturing apparatus 21f for a ring-shaped member of this example, when the pressing forces in the axial direction that are applied to the pair of support shaft sections 37c, 37d from the metal blank 26 in a state after the molding space is filled with the metal blank 26 (see FIG. 14A) after processing are greater than a specified value, each of the pair of support shaft sections 37c, 37d displaces against the elastic force of the elastic members 58 in directions away from the rolling shaft section 38a. The outer-diameter constraining die elements 74a, 74b of the outer-diameter constraining die 36a are able to displace in directions away from each other due to the displacement of the pair of support shaft sections 37c, 37d. Therefore, both end sections in the axial direction of the molding space and the axial-direction gaps 78 (see FIG. 9) that are formed between the other end surface in the axial direction of the one outer-diameter constraining die element 74a and the one end surface in the axial direction of the other outer-diameter constraining die element 74b are released, and excess material of the metal blank 26 can be released from these portions. The other construction and functional effects are the same as in the third example of an embodiment and a seventh example of an embodiment.

Ninth Example

Figure 12:
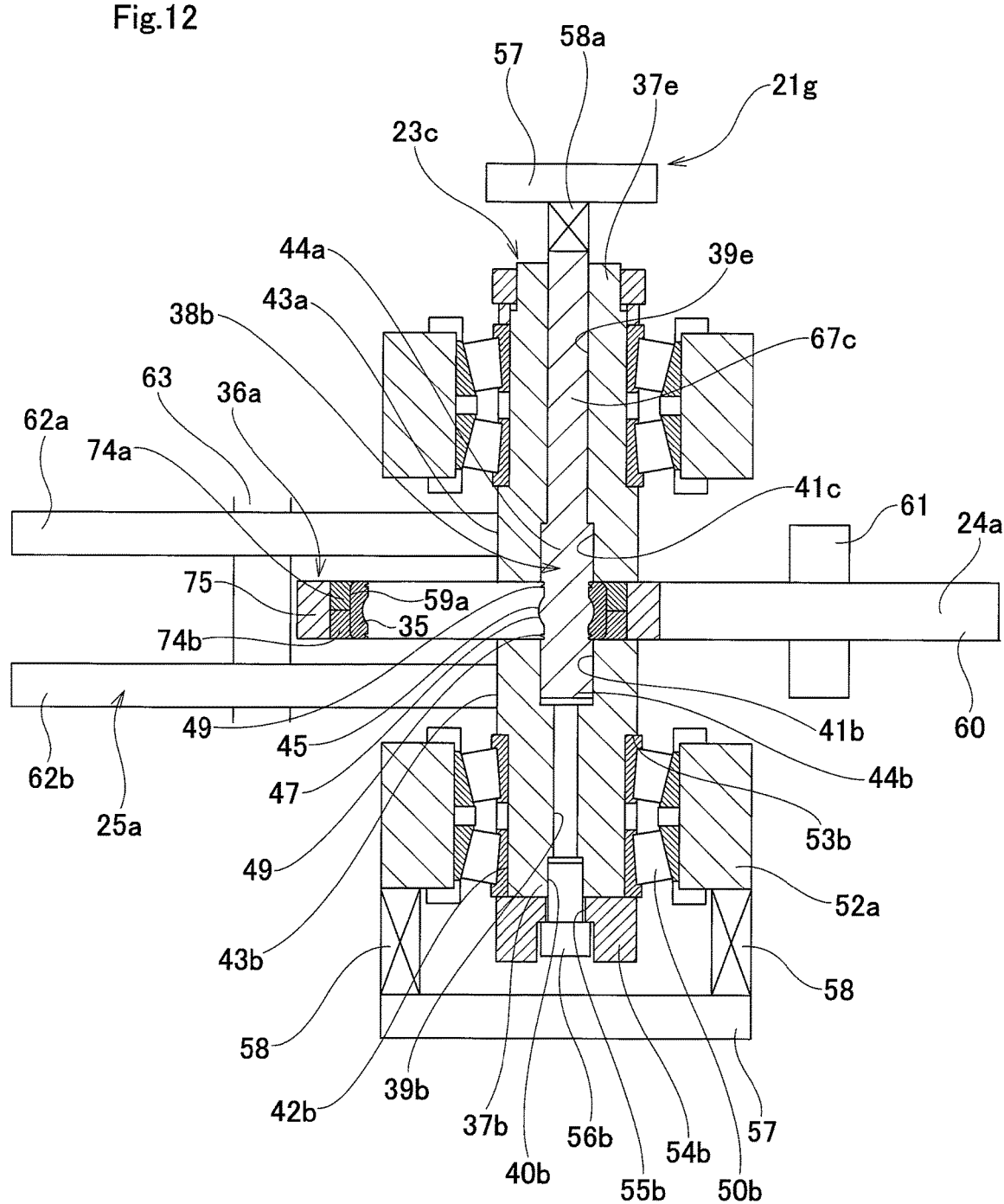
FIG. 12 is a cross-sectional view similar to FIG. 1, and illustrates a ninth example of an embodiment of the present invention.

FIG. 12 illustrates a ninth example of an embodiment of the present invention. The manufacturing apparatus 21g for a ring-shaped member of this example has construction that combines the construction of the fourth example of an embodiment and the seventh example of an embodiment. In other words, a connecting shaft section 67c is provided on one end surface in the axial direction of the rolling shaft section 38b having a diameter that is smaller than the one fitting section 44a of the rolling shaft section 38b, and extends in one direction in the axial direction from that end surface, and the connecting shaft section 67c is inserted through the center hole 39e in the one support shaft section 37e. The tip-end section of the connecting shaft section 67c is supported by a fixed portion 57 by way of a mechanical type (such as a spring or the like), a hydraulic type, a gas pressure type or a pneumatic type elastic member 58a. The elastic member 58a applies an elastic force to the rolling shaft section 38b in a direction toward the one support shaft section 37e. In a state in which an elastic force is applied by the elastic member 58a, the rolling shaft section 38b is such that displacement to the one side in the axial direction is regulated by engagement (contact) between the one end surface in the axial direction of the one fitting section 44a and the bottom section of the fitting hole 41c in the one support shaft section 37e. Therefore, when a strong pressing force is applied to the rolling shaft section 38b in a specified axial direction (direction away from the one support shaft section 37e), the rolling shaft section 38b is able to displace against the elastic force of the elastic member 58a in a direction away from the one support shaft section 37e.

The outer-diameter constraining die 36a includes a pair of outer-diameter constraining die elements 74a, 74b and an outer-circumference holding member 75. However, it is also possible to use the outer-diameter constraining die 36b of the seventh example of an embodiment as the outer-diameter constraining die. The other construction and functional effects are the same as in the fourth example of an embodiment and the seventh example of an embodiment.

Tenth Example

Figure 13:
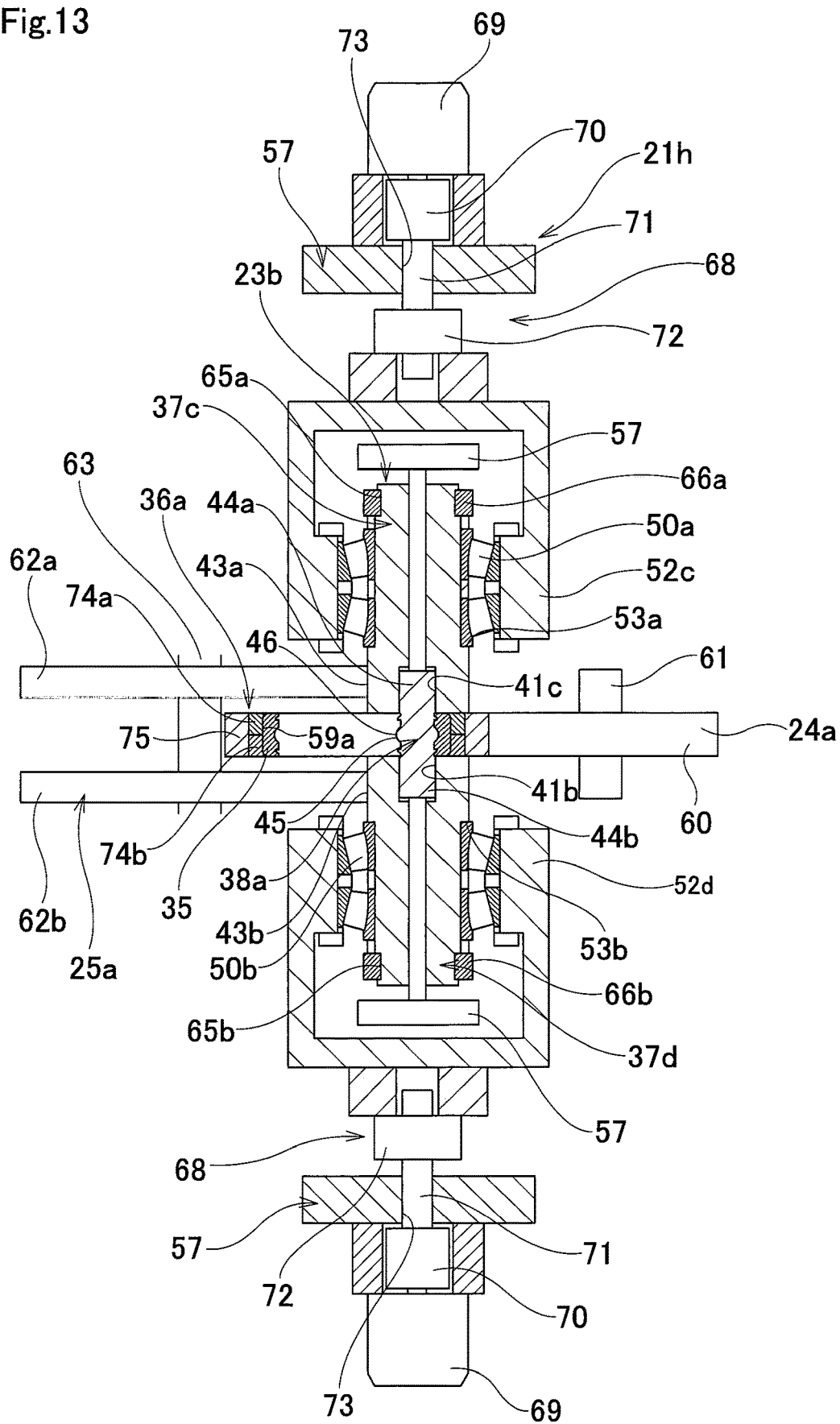
FIG. 13 is a cross-sectional view similar to FIG. 1, and illustrates a tenth example of an embodiment of the present invention.
Figure 14:
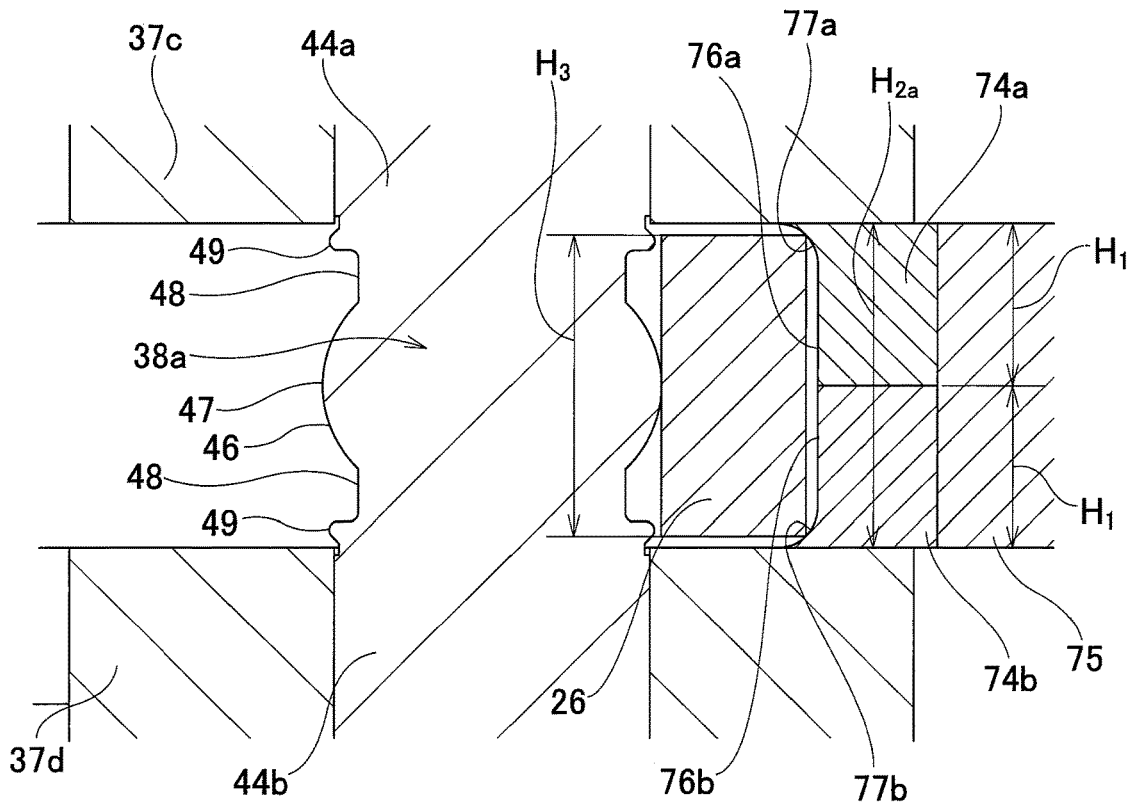
FIG. 14A illustrates the state before beginning processing of a portion that corresponds to D in FIG. 8 of the manufacturing apparatus for a ring-shaped member of the tenth example of an embodiment of the present invention.
FIG. 14B illustrates the state after processing of this portion.
Figure 14:
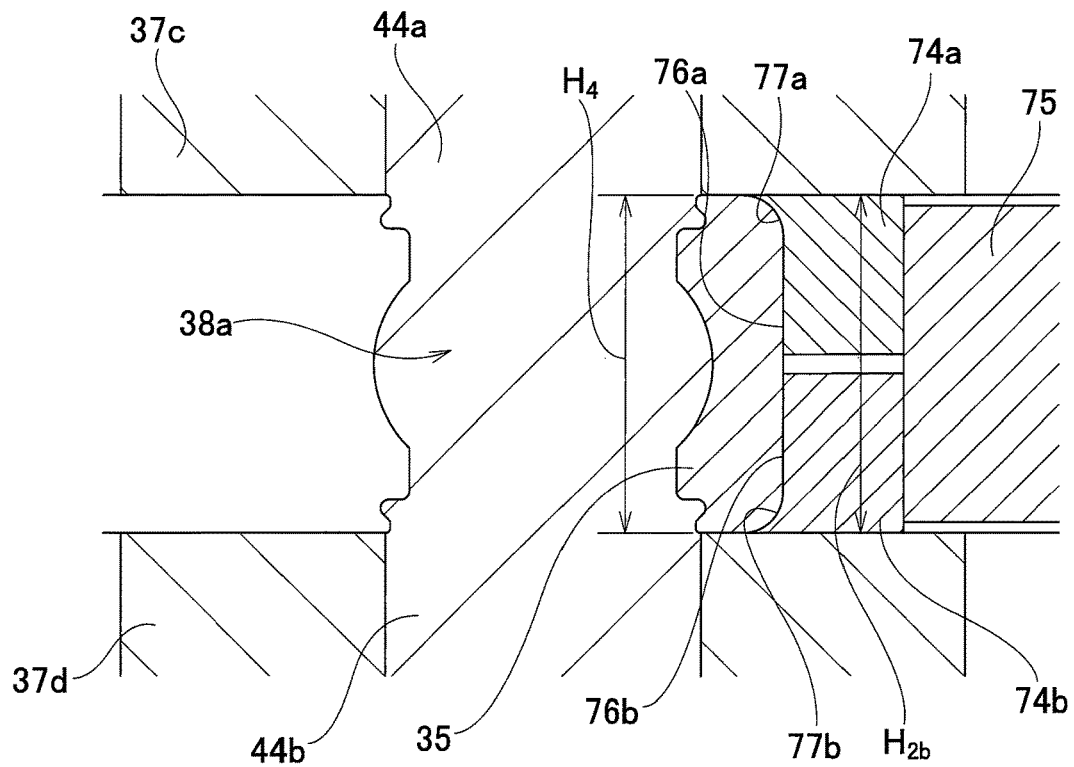

FIG. 13 and FIG. 14 illustrate a tenth example of an embodiment of the present invention. The manufacturing apparatus 21h for a ring-shaped member of this example has construction that combines the construction of the fifth example of an embodiment and the construction of the seventh example of an embodiment. In other words, the pair of support shaft sections 37c, 37d of the mandrel 23b are rotatably supported by way of radial tapered roller bearings 50a, 50b with respect to displaceable support sections 52c, 52d. The displaceable support sections 52c, 52d are each supported by feed screw mechanisms 68 so as to be able to displace in the axial direction with respect to fixed portions 57.

When the axial-direction dimensions of the pair of outer-diameter constraining die elements 74a, 74b of the outer-diameter constraining die 36a are each taken to be $H_1$ in a state in which a metal blank 26 is set in the manufacturing apparatus 21h for a ring-shaped member, the length dimension $H_1 \times 2$ of the outer-diameter constraining die elements 74a, 74b when these outer-diameter constraining die elements 74a, 74b are arranged side-by-side in the axial direction with no space between is equal to the distance $H_{2a}$ between the surfaces of the pair of support shaft sections 37c, 37d that face each other in the axial direction ($H_1 \times 2 = H_{2a}$). Therefore, the one end surface in the axial direction of the one outer-diameter constraining die element 74a comes in contact with the other end surface in the axial direction of the one support shaft section 37c, and the other end surface in the axial direction of the other outer-diameter constraining die element 74b comes in contact with the one end surface in the axial direction of the other support shaft section 37d. Moreover, the axial-direction dimension $H_3$ of the metal blank 26 in a state in which the pair of outer-diameter constraining die elements 74a, 74b are arranged side-by-side in the axial direction with no space in between is less than the length dimension $H_1 \times 2$ of the outer-diameter constraining die elements 74a, 74b, and less than the distance $H_{2a}$ between the surfaces of the support shaft sections 37c, 37d that face each other ($H_3 < H_1 \times 2$, $H_3 < H_{2a}$).

In the method used by the manufacturing apparatus 21h for a ring-shaped member of this example, when the forming roll 24a is displaced (pressed) further toward the outer-diameter constraining die 36a (outer-circumference holding member 75) from the state in which the molding space that is formed between the first rolling surface 46 of the mandrel 23b, the second rolling surface 59a of the outer-diameter constraining die 36a and the end surfaces of the pair of support shaft sections 37c, 37d that face each other is filled with the metal blank 26, the internal stress inside the metal blank 26 increases. The metal blank 26 then presses the mandrel 23b, the outer-diameter constraining die 36a and the pair of support shaft sections 37c, 37d that form the molding space. Of the pressing forces by the metal blank 26, when the pressing forces in the axial direction that are applied to the pair of support shaft sections 37c, 37d, or in other words, when the torques that are applied to the pair of servo motors 69 exceed a specified value, the pair of servo motors 69 drive and cause the pair of support shaft sections 37c, 37d to displace the same amount in directions away from the rolling shaft section 38a. As a result, as illustrated in FIG. 14B, the distance $H_{2b}$ of the surfaces of the pair of support shaft sections 37c, 37d that face each other in the axial direction becomes larger than the distance $H_{2a}$ of the surfaces of the pair of support shaft sections 37c, 37d that face each other in the axial direction in the state illustrated in FIG. 14A. Then, both end sections in the axial direction of the molding space are released, and excess material of the metal blank 26 is able to be released from those portions. Moreover, as the pair of support shaft sections 37c, 37d displace, the outer-diameter constraining die elements 74a, 74b of the outer-diameter constraining die 36a are able to displace in directions in the axial direction away from each other. Then, when pressing forces in the axial direction are applied to the curved sections 77a, 77b of the inner-circumferential surfaces of the pair of outer-diameter constraining die elements 74a, 74b from both end sections in the axial direction of the outer-circumferential surface of the metal blank 26, the pair of outer-diameter constraining die elements 74a, 74b displace in directions in the axial direction away from each other. The axial-direction dimension $H_4$ of the ring-shaped member 35a that is obtained by using the manufacturing apparatus 21h for a ring-shaped member of this example is greater than the length dimension $H_1 \times 2$ of the pair of outer-diameter constraining die elements 74a, 74b and the distance $H_{2a}$ in the axial direction between the surfaces of the pair of support shaft sections 37c, 37d that face each other ($H_4 > H_1 \times 2$, $H_4 > H_{2a}$). The axial-direction dimensions of the metal blank 26, the ring-shaped member 35, and the outer-diameter constraining die elements 74a, 74b, and the distance in the axial direction between the surfaces of the pair of support shaft sections 37c, 37d that face each other are the same as in the seventh example of an embodiment.

The processing described above can be repeated as many times as necessary until a ring-shaped member having a desired shape is obtained. More specifically, when the pair of support shaft sections 37c, 37d are displaced in directions away from the rolling shaft section 38a, and the size of the pressing forces in the axial direction that are applied to the support shaft sections 37c, 37d from the metal blank 26 becomes less than a specified value, driving of the pair of servo motors 69 stops. Continuing processing in this state, when the internal stress inside the metal blank 26 increases again, and the pressing forces in the axial direction by which the metal blank 26 presses the support shaft sections 37c, 37d (torques applied to the servo motors 69) become greater than a specified value, the pair of servo motors 69 drive and displace the support shaft sections 37c, 37d the same amount in directions away from the rolling shaft section 38a. The other construction and functional effects are the same as in the fifth example of an embodiment and the seventh example of an embodiment.

Eleventh Example

FIG. 15 to FIG. 17B illustrate an eleventh example of an embodiment of the present invention. The manufacturing apparatus 21i for a ring-shaped member of this example includes a mandrel 23c, a pair of movable annular-shaped members 80a, 80b, an outer-diameter constraining die 36, a forming roll 24a, and a support roll 25a. The mandrel 23c has a pair of support shaft sections 37a, 37b, and a rolling shaft section 38c. The rolling shaft section 38c includes a fixed shaft member 81, a raceway forming member 82, and a pair of locking groove forming members 83a, 83b. The fixed shaft member 81 is a circular column-shaped member having an axial-direction dimension that is less than the pair of support shaft sections 37a, 37b, and an outer diameter that does not change over the entire length, and the portions on both ends in the axial direction of the fixed shaft member 81 function as fitting sections 44c, 44d. The outer-diameter dimension of one fitting section 44c of the fitting sections 44c, 44d is a little larger than the inner-diameter dimension of a fitting hole 41a in the one support shaft section 37a. The outer-diameter dimension of the other fitting section 44d of the fitting sections 44c, 44d is a little smaller than the inner-diameter dimension of a fitting hole 41b in the other support shaft section 37b.

The raceway forming member 82 is a cylindrical member, the inner-circumferential surface of which is formed into a cylindrical surface having an inner diameter that does not change in the axial direction, and the outer-circumferential surface of the raceway forming member 82 is formed into a curved surface shape having an outer diameter that becomes large going toward the center in the axial direction. The outer-circumferential surface of the raceway forming member 82 is for forming an outer-ring raceway in the center section in the axial direction of the inner-circumferential surface of the metal blank 26. The raceway forming member 82 is fitted around the outside of and fastened to the center section in the axial direction of the outer-circumferential surface of the fixed shaft member 81.

The pair of locking groove forming members 83a, 83b are circular ring-shaped members. One locking groove forming member 83a of the pair of locking groove forming members 83a, 83b is formed into a cylindrical surface shape of which the inner-circumferential surface has an inner diameter that does not change in the axial direction, and that one locking groove forming member 83a is fitted around the outside of and fastened to a portion of the outer-circumferential surface of the fixed shaft member 81 that is further on the one side in the axial direction (upper side in FIG. 16) than the raceway forming member 82, and is separated from the one end surface in the axial direction of the raceway forming member 82. The outer-circumferential surface of the one locking groove forming member 83a includes a cylindrical surface section 84a and a convex section 85a. The cylindrical surface section 84a is formed on half of one side in the axial direction of the outer-circumferential surface of the one locking groove forming member 83a in a state in which the outer diameter does not change in the axial direction. The convex section 85a is formed on half of the other side in the axial direction of the outer-circumferential surface of the one locking groove forming member 83a so as to protrude further outward in the radial direction than the cylindrical surface section 84a around the entire circumference. The convex section 85a is such that the cross-sectional shape on an imaginary plane that passes through the center axis of the one locking groove forming member 83a is a semi-circular shape of which the dimension in the axial direction becomes smaller going toward the outer-diameter side. The outer-circumferential surface of the one locking groove forming member 83a is for forming a seal locking groove for locking a seal ring into a portion near one end in the axial direction of the inner-circumferential surface of the metal blank 26.

The other locking groove forming member 83b of the pair of locking groove forming members 83a, 83b is such that the inner-circumferential surface thereof is formed into a cylindrical surface shape having an inner diameter that does not change in the axial direction, and is fitted around the outside of and fastened to a portion of the outer-circumferential surface of the fixed shaft member 81 that is further on the other side in the axial direction (bottom side in FIG. 16) than the raceway forming member 82, and is separated from the other end surface in the axial direction of the raceway forming member 82. The outer-circumferential surface of the other locking groove forming member 83b has a cylindrical surface section 84b and a convex section 85b. The cylindrical surface section 84b is formed on half of the other side in the axial direction of the outer-circumferential surface of the other locking groove forming member 83b, and the outer diameter does not change in the axial direction. The convex section 85b is formed on half of one side in the axial direction of the outer-circumferential surface of the other locking groove forming member 83b so as to protrude further outward in the radial direction than the cylindrical surface section around the entire circumference. The convex section 85b has a cross-sectional shape on an imaginary plane that passes through the center axis of the other locking groove forming member 83b that is formed into semi circular shape of which the dimension in the axial direction becomes smaller going toward the outer-diameter side. The outer-circumferential surface of the other locking groove forming member 83b is for forming a seal locking groove for locking a seal ring into a portion near the other end in the axial direction of the inner-circumferential surface of the metal blank 26.

The first rolling surface 46a for performing a rolling process on the inner-circumferential surface of the annular-shaped metal blank 26 is constructed by the outer-circumferential surface of the raceway forming member 82 and the outer-circumferential surfaces of the pair of locking groove forming members 83a, 83b.

By fitting the one fitting section 44c inside the fitting hole 41a of the one support shaft section 37a with an interference fit, the rolling shaft section 38c is supported and fastened in a state in which displacement in the axial direction and inclination with respect to the one support shaft section 37a is regulated. The rolling shaft section 38c is such that the other fitting section 44d fits inside the fitting hole 41b of the other support shaft section 37b with a loose fit. Therefore, the other support shaft section 37b is able to displace in the axial direction with respect to the rolling shaft section 38c in order to be able to mount or remove the metal blank 26. However, during processing, the other support shaft section 37b is regulated so as not to displace in the axial direction with respect to the rolling shaft section 38c. The outer-diameter dimension of the other fitting section 44d and the inner-diameter of the fitting hole 41b of the other support shaft section 37b are regulated within a range in which the rolling shaft section 38c can displace in the axial direction with respect to the other support shaft section 37b, and so that the amount of movement and inclination in the radial direction of the rolling shaft section 38c with respect to the other support shaft section 37b is kept to a minimum.

The pair of support shaft sections 37a, 37b of the mandrel 23c, by way of double-row radial tapered roller bearings 50a, 50b that are fitted around the outside of small-diameter cylindrical sections 42a, 42b, are supported by fixed support sections 51a, 51b that are supported by and fastened to fixed portions such as a housing that do not displace during processing of the metal blank 26. The fixed support sections 51a, 51b, other than during processing of the metal blank 26, are able to move out of the way in the axial direction, for example, in order to be able to mount or remove the metal blank 26. The end surfaces on the rolling shaft section 38c sides of the inner rings of the radial tapered roller bearings 50a, 50b come in contact with stepped sections 53a, 53b that connect the small-diameter cylindrical sections 42a, 42b and mandrel side regulating surfaces 43a, 43b. The end surfaces on the opposites sides from the rolling shaft section 38c of the inner rings of the radial tapered roller bearings 50a, 50b come in contact with the end surfaces of constraining members 54a, 54b that are attached to the support shaft sections 37a, 37b. With this kind of construction, it is possible to position the radial tapered roller bearings 50a, 50b in the axial direction. The constraining members 54a, 54b have a ring-shaped plate shape, and are attached to the end sections on the opposite sides from the rolling shaft section 38c of the support shaft sections 37a, 37b by screwing bolts 56a, 56b that are inserted through holes 55a, 55b that are formed in the center sections into threaded holes 40a, 40b in the support shaft sections 37a, 37b. The support shaft sections 37a, 37b are supported by the fixed support sections 51a, 51b by way of the radial tapered roller bearings 50a, 50b, so it is possible to reduce vibration of the end sections on the rolling shaft section 38c sides of the support shaft sections 37a, 37b.

The pair of movable annular-shaped members 80a, 80b are circular ring-shaped members that are made of a metal such as die steel, high-speed steel, cemented carbide or the like. The pair of movable annular-shaped members 80a, 80b have the same shape, and the inner-circumferential surfaces thereof are cylindrical surface shapes having an inner-diameter dimension that does not change in the axial direction. The inner-diameter dimension $d_{80}$ of the movable annular-shaped members 80a, 80b is larger than the outer-diameter dimension $D_{81}$ of the fixed shaft member 81 ($d_{80} > D_{81}$). The outer-circumferential surfaces of the movable annular-shaped members 80a, 80b have a cylindrical surface shape of which the outer-diameter dimension does not change in the axial direction. One movable annular-shaped member 80a of the movable annular-shaped members 80a, 80b is arranged between the raceway forming member 82 and the one locking groove forming member 83a. More specifically, the one movable annular-shaped member 80a is arranged in a state such that one part in the circumferential direction on the forming roll 24a side of one end surface in the axial direction of the one movable annular-shaped member 80a is brought into contact with the other end surface in the axial direction of the one locking groove forming member 83a, and part in the circumferential direction on the forming roll 24a side of the other end surface in the axial direction of the one movable annular-shaped member 80a is brought into contact with one end surface in the axial direction of the raceway forming member 82. In this state, the outer-circumferential surface of the one movable annular-shaped member 80a is made to face a portion of the metal blank 26 between the portion where the outer-ring raceway is formed and the portion where one seal locking groove is formed after processing. The portion of the inner-circumferential surface of the metal blank 26 that the outer-circumferential surface of the one movable annular-shaped member 80a faces is the portion located on the most inner-diameter side of the inner-circumferential surface of the ring-shaped member 35b after processing.

The other movable annular-shaped member 80b of the pair of movable annular-shaped members 80a, 80b is arranged between the raceway forming member 82 and the other locking groove forming member 83b. More specifically, the other movable annular-shaped member 80b is arranged in a state such that part in the circumferential direction on the forming roll 24a side of the other end surface in the axial direction of the other movable annular-shaped member 80b is brought into contact with one end surface in the axial direction of the other locking groove forming member 83b, and part in the circumferential direction on the forming roll 24a side of one end surface in the axial direction of the other movable annular-shaped member 80b is brought into contact with the other end surface in the axial direction of the raceway forming member 82. In this state, the outer-circumferential surface of the one movable annular-shaped member 80a is made to face a portion of the inner-circumferential surface of the metal blank 26 between the portion where the outer-ring raceway is formed and the portion where the other seal locking groove is formed after processing. The portion of the inner-circumferential surface of the metal blank 26 that the outer-circumferential surface of the other movable annular-shaped member 80b faces is arranged at the most inner-diameter side of the inner-circumferential surface of the ring-shaped member 35b after processing, in the same way as the portion that the one movable annular-shaped member 80a faces.

Elastic supporting means 86 for elastically supporting the pair of movable annular-shaped members 80a, 80b are provided between the pair of movable annular-shaped members 80a, 80b and fastening and supporting sections (not illustrated in the figures) that are supported by and fastened to fixed portions such as a housing. This kind of elastic supporting means 86 includes an elastic member such as a coil spring.

Figure 17:
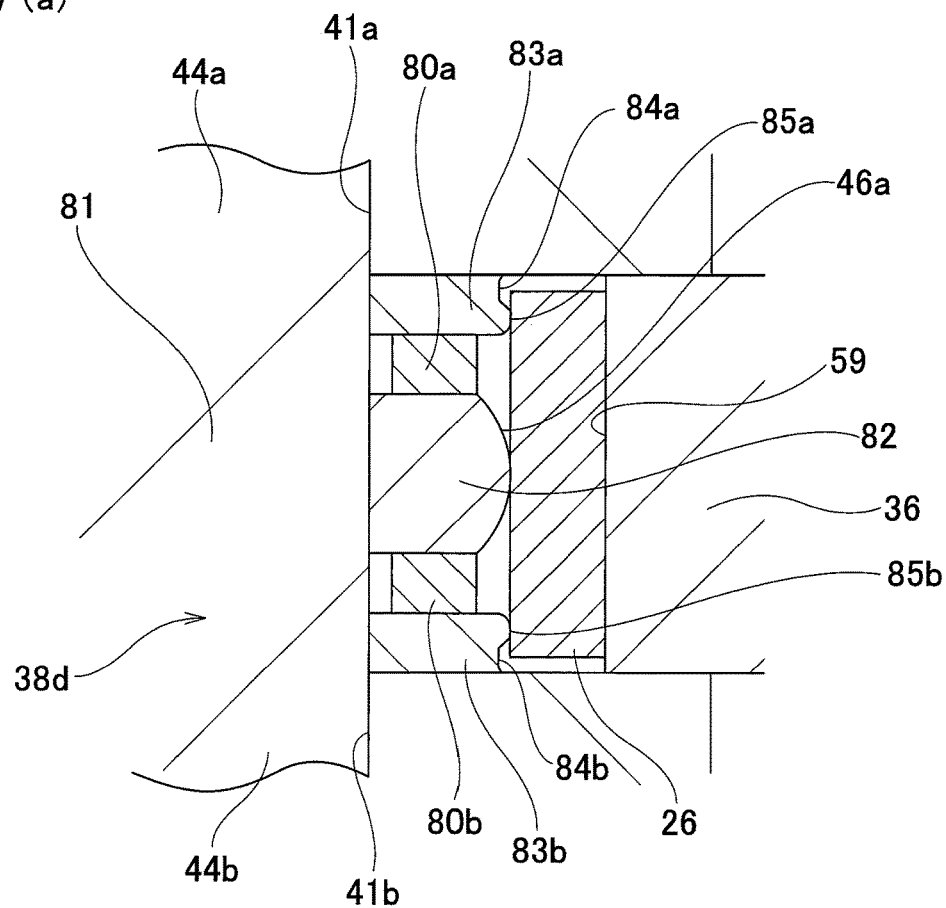
FIG. 17A illustrates the state before beginning processing of a portion that corresponds to F in FIG. 15.
FIG. 17B illustrates the state after processing is ended.
Figure 17:
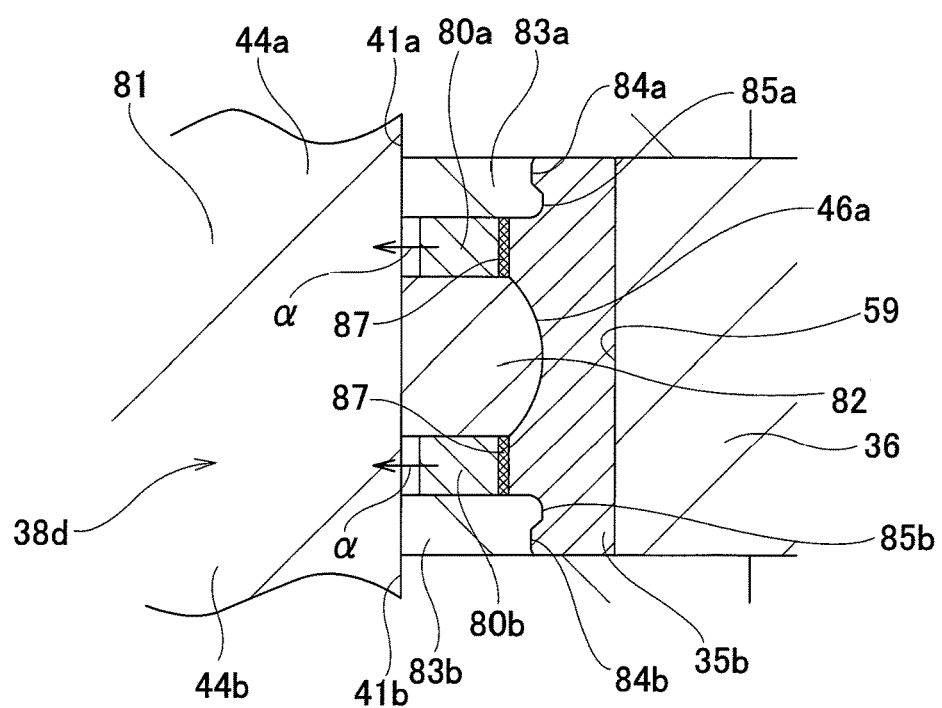

In the state illustrated in FIG. 17A before starting the process for assembling the metal blank 26 in the manufacturing apparatus 21i for a ring-shaped member, the elastic supporting means 86 does not press the movable annular-shaped members 80a, 80b in the radial direction toward the forming roll 24a (left-right direction in FIG. 17) (an elastic force is not applied). Moreover, in the state before processing, there are gaps in the radial direction between portions on the forming roll 24a side of the inner-circumferential surfaces of the movable annular-shaped members 80a, 80b and the outer-circumferential surface of the fixed shaft member 81. When a pressing force having a specified size is applied to the movable annular-shaped members 80a, 80b in a direction away from the forming roll 24a, by elastically deforming, the elastic supporting means 86 allows the movable annular-shaped members 80a, 80b to displace in the direction of the pressing force (direction away from the forming roll 24a). The manufacturing apparatus 21i for a ring-shaped member of this example is such that even in the state after processing has finished as illustrated in FIG. 17B, the dimensions of each of the parts are regulated so that there are gaps in the radial direction between the portions on the forming roll 24a side of the inner-circumferential surfaces of the movable annular-shaped members 80a, 80b and the outer-circumferential surface of the fixed shaft member 81.

Figure 15:
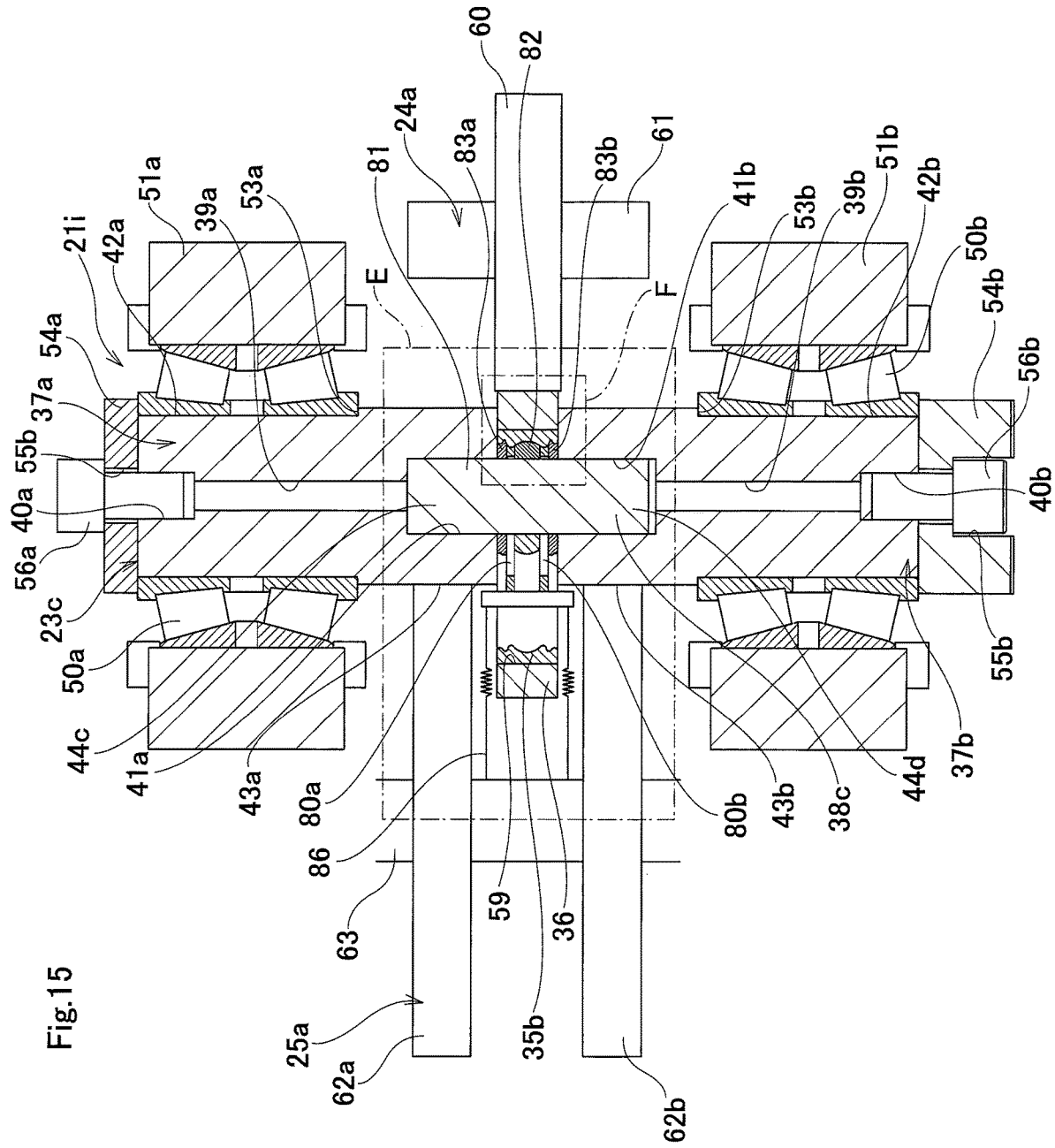
FIG. 15 is a cross-sectional view similar to FIG. 1, and illustrates an eleventh example of an embodiment of the present invention.
Figure 16:
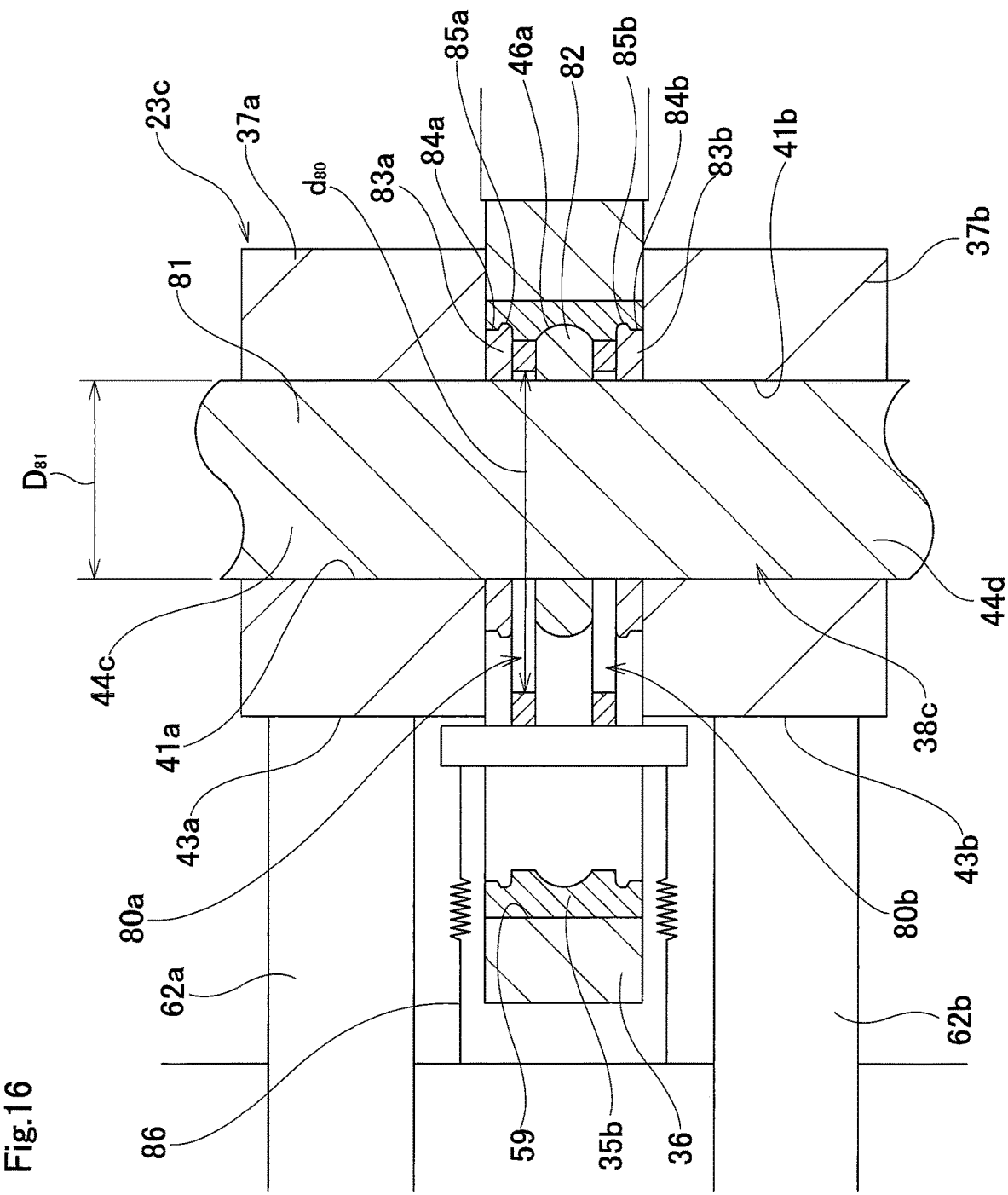
FIG. 16 is an enlarged cross-sectional view that corresponds to E in FIG. 15.

The elastic force of the elastic supporting means 86 is appropriately set according to the relationship with the processing conditions. FIG. 15 and FIG. 16 schematically illustrate the elastic supporting means 86, however, as long as this elastic supporting means 86 can elastically support the movable annular-shaped members 80a, 80 in the radial direction, the construction is not limited to a single member, and it is also possible to use a combination of members. Moreover, for the elastic supporting member 86, it is possible to employ various types of construction such as mechanical type, hydraulic type, gas pressure type, pneumatic pressure type and the like. The construction of the outer-diameter constraining die 36, forming roll 24a and support roll 25 is the same as in the first example of an embodiment.

The procedure for making a ring-shaped member 35b by using the manufacturing apparatus 21i for a ring-shaped member to perform a rolling process on the metal blank 26 will be explained. First, as illustrated in FIG. 17A, the metal blank 26 is arranged so that, with the mandrel 23 inserted through the inner side in the radial direction, part of the circumferential surface of the metal blank 26 is placed inside the molding space that is defined by the first rolling surface 46a of the mandrel 23c, the outer-circumferential surfaces of the movable annular-shaped members 80a, 80b, the second rolling surface 59 of the outer-diameter constraining die 36 and the end surfaces on the rolling shaft section 38c side of the pair of support shaft sections 37a, 37b. In this state, there are specified gaps between the outer-circumferential surfaces of the movable annular-shaped members 80a, 80b and the inner-circumferential surface of the metal blank 26. Moreover, part of the outer-circumferential surfaces of the pair of rollers 62a, 62b of the support roll 25a are made to closely face the mandrel-side regulating surfaces 43a, 43b of the mandrel 23c.

Next, in a state in which the forming roll 24a and the support roll 25a are rotated and driven by rotating and driving the electric motor 34, the forming roll 24a is displaced in the horizontal direction toward the outer-diameter constraining die 36, and the outer-circumferential surface of the roller 60 of the forming roller 24a is brought into contact with the outer-circumferential surface of the outer-diameter constraining die 36. The outer-diameter constraining die 36 is rotated as the forming roll 24a rotates.

When the forming roll 24a is further displaced toward the outer-diameter constraining die from the state in which the outer-circumferential surface of the roller 60 came in contact with the outer-circumferential surface of the outer-diameter constraining die 36, the mandrel 23c is pressed toward the left side in FIG. 15 by way of the outer-diameter constraining die 36 and the metal blank 26, and the outer-circumferential surface of the rollers 62a, 62b of the support roll 25a come in strong contact with mandrel-side regulating surfaces 43a, 43b of the mandrel 23c. In this state, the mandrel 23c is made to rotate by the rotating of the rollers 62a, 62b of the support roll 25a. Moreover, in this state, the outer-diameter constraining die 36 and the mandrel 23c rotate in synchronization, and the metal blank 26 rotates due to the rotation of the outer-diameter constraining die 36 and the mandrel 23c.

When the forming roll 24a is displaced toward the outer-diameter constraining die 36 from this state, first, the metal blank 26 plastically deforms so that the axial-direction dimension of the metal blank 26 increases until both end surfaces in the axial direction of the metal blank 26 come in contact with the end surface on the rolling shaft section 38c side of the pair of support shaft sections 37a, 37b. When both end surfaces in the axial direction of the metal blank 26 come in contact with the end surfaces on the rolling shaft section 38c side of the pair of support shaft sections 37a, 37b, the metal blank 26 plastically deforms so that the outer diameter increases until the outer-circumferential surface of the metal blank 26 comes in contact around the entire surface of the inner-circumferential surface of the outer-diameter constraining die 36. The molding space then becomes filled with the metal blank 26. At that point in time, the inner-circumferential surface of the metal blank 26 also comes in contact with the outer-circumferential surfaces of the pair of movable annular-shaped members 80a, 80b.

When the forming roll 24a is further displaced toward the outer-diameter constraining die 36 from the state in which the molding space became filled with the metal blank 26, the internal stress inside the metal blank 26 increases, and the metal blank 26 presses the mandrel 23c, outer-diameter constraining die 36, pair of movable annular-shaped members 80a, 80b and pair of support shaft sections 37a, 37b that form the molding space. Then, of the pressing forces of the metal blank 26, when the pressing forces in a direction away from the forming roll 24a that are applied to the outer-circumferential surface of the pair of movable annular-shaped members 80a, 80b exceed the elastic force of the elastic supporting means 86, the movable annular-shaped members 80a, 80b displace in a direction away from the forming roll 24a (left direction in FIG. 15 to FIG. 17B)

against the elastic force of the elastic supporting means 86 as illustrated by the arrow α in FIG. 17B. As a result, it is possible for the excess material of the metal blank 26 to be released into the expanded portion 87 (portion that is indicated by the diagonal lattice) of the molding space that is expanded by the displacement of the movable annular-shaped members 80*a*, 80*b*. In other words, in this example, the pair of movable annular-shaped members 80*a*, 80*b* correspond to an excess material release means. After the forming roll 24*a* has been rotated and driven for a specified amount of time, or after the forming roll 24*a* has been displaced a specified amount toward the outer-diameter constraining die 36, displacement and rotation of the forming roll 24*a* is stopped, and the rolling process ends. An outer ring 2 (see FIG. 21) is then obtained by performing as necessary a finishing process such as a cutting process, grinding process and the like on the ring-shaped member 35*b* that is obtained from this kind of rolling process.

With the manufacturing method and manufacturing apparatus for a ring-shaped member of this example described above, together with being able to prevent the occurrence of damage to the mandrel 23*c* and the outer-diameter constraining die 36, it is also possible improve the precision of the shape of the ring-shaped member 35*b* after processing. In other words, in this example, a pair of movable annular-shaped members 80*a*, 80*b* are provided such that when a pressing force in a direction away from the forming roll 24*a* is applied in a state in which the annular-shaped members 80*a*, 80*b* face the inner-circumferential surface of the metal blank 26, the annular-shaped members 80*a*, 80*b* are supported so as to be able to displace in the direction of the pressing force. Therefore, even when the internal stress inside the metal blank 26 inside the molding space increases during use, it is possible for the pair of movable annular-shaped members 80*a*, 80*b* to displace in the direction of the pressing force, and excess material of the metal blank 26 is able to be released into the portion of the molding space that was expanded due to that displacement. As a result, the internal stress inside the metal blank 26 inside the molding space decreases, and thus it is possible to reduce the stress applied to the mandrel 23*a*. Moreover, it is possible to release the internal stress inside the metal blank 26 during processing, so it is possible to prevent distortion of the metal blank 26 inside the molding space, and to prevent the roundness of the ring-shaped member 35*b* after processing from becoming worse.

Moreover, the outer-circumferential surfaces of the movable annular-shaped members 80*a*, 80*b* are made to face portions of the inner-circumferential surface of the metal blank 26 that are located on the most inner-diameter side after processing, so even when excess material is formed in those portions, it is possible to easily perform a cutting process for removing the excess material. The portions that face the outer-circumferential surfaces of the movable annular-shaped members 80*a*, 80*b* are portions between the outer-ring raceway of the ring-shaped member 35*b* and the seal locking grooves, and are portions with the least mechanical importance. Therefore, the required dimensional precision is lower compared to other portions, so it is possible to omit processing for removing the excess material, or in the case that such processing is performed, the processing could be performed simply.

Moreover, in the final stage of processing, the outer-circumferential surface, both end surfaces in the axial direction and the inner-circumferential surface (except the portions that face the outer-circumferential surfaces of the movable annular-shaped members 80*a*, 80*b*) of the metal blank 26 can be constrained by the opposing second rolling surface 59 of the outer-diameter constraining die 36, the pair of support shaft sections 37*a*, 37*b* and the first rolling surface 46*a* of the mandrel 23*c*. Therefore, a cutting process on the constrained portions of the ring-shaped member 35*b* does not need to be performed after processing, or even in the case that such processing is performed, only a little processing is required. As a result, it is possible to improve productivity by shortening the cutting process, or by limiting the locations where the cutting process is performed. Depending on the product, the ring-shaped member 35*b* that is manufactured by the manufacturing method of this example may be obtained as the final product without performing a finishing process.

In this example, the raceway forming member 82 and the locking groove forming members 83*a*, 83*b*, which are separate members, are fitted around the outside of the outer-circumferential surface of the fixed shaft member 81 of the rolling shaft section 38*c* of the mandrel 23*c*, and the first rolling surface 46*a* is constructed by the outer-circumferential surfaces of the raceway forming member 82 and locking groove forming members 83*a*, 83*b*. However, it is also possible to employ construction in which the first rolling surface is directly formed around the outer-circumferential surface of the fixed shaft member. The other construction and functional effects are the same as in the first example of an embodiment.

Twelfth Example

Figure 18:
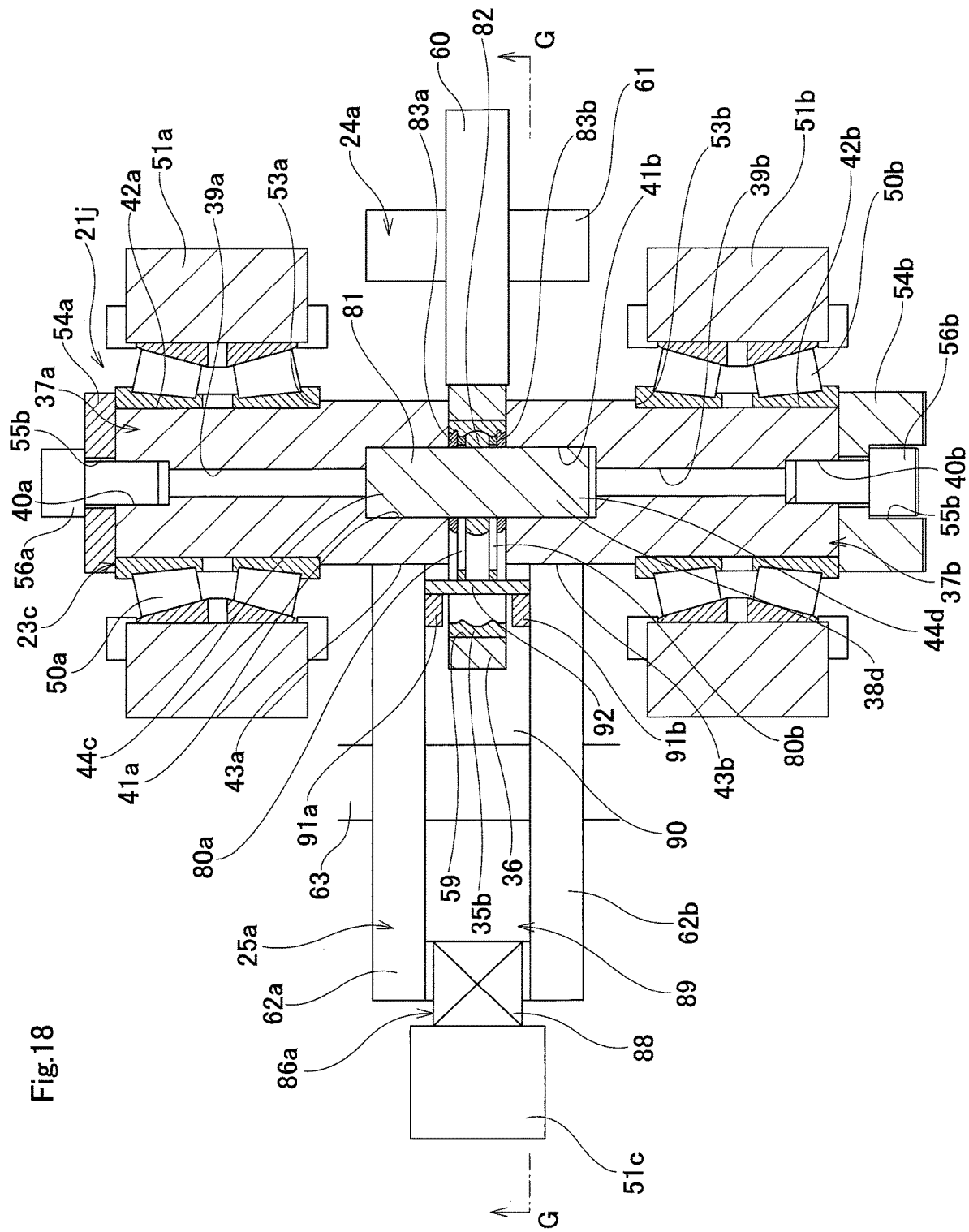
FIG. 18 is a cross-sectional view similar to FIG. 1, and illustrates a twelfth example of an embodiment of the present invention.
Figure 19:
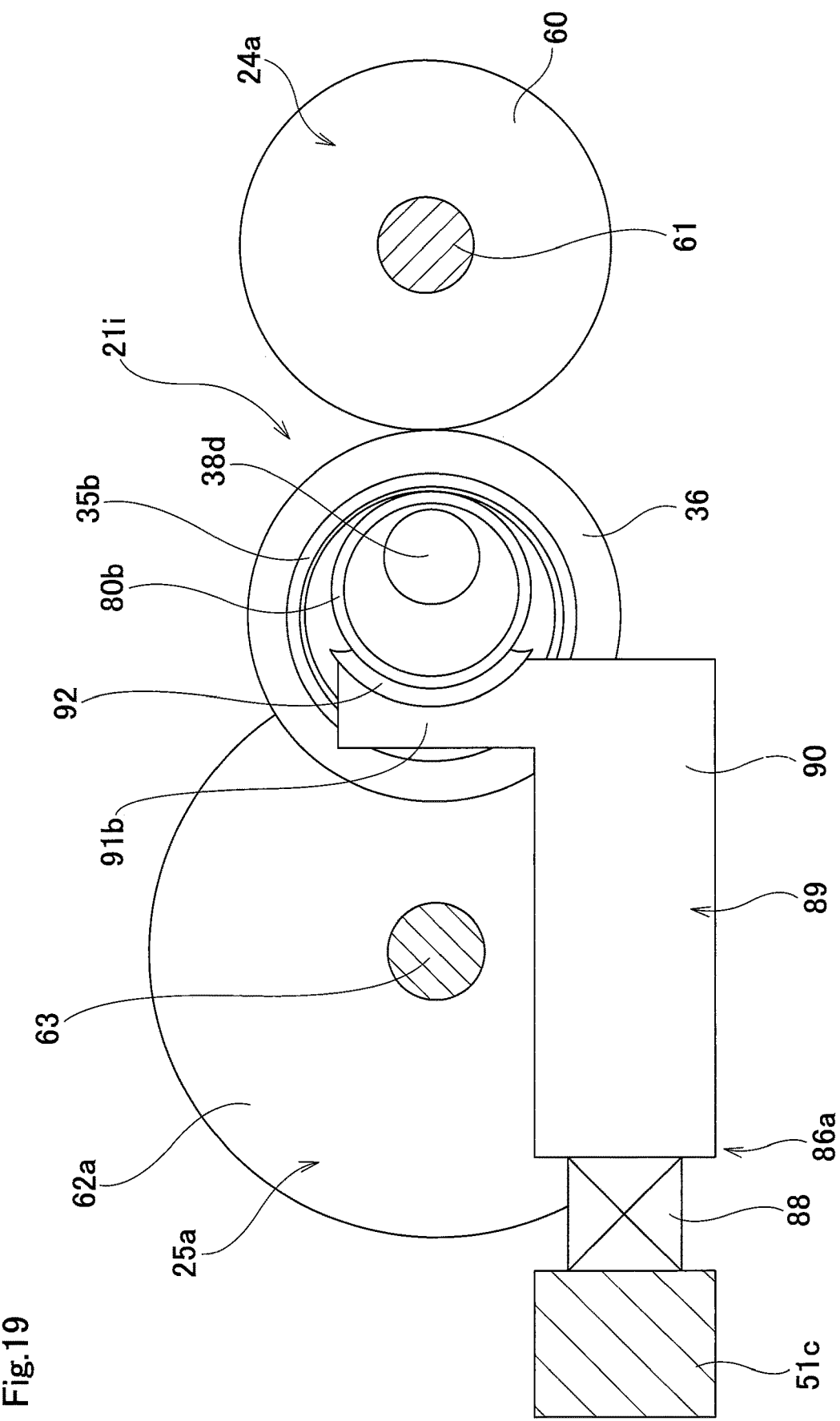
FIG. 19 illustrates a portion corresponding to cross-section G-G in FIG. 18, which part of the members omitted.

FIG. 18 and FIG. 19 illustrate a twelfth example of an embodiment of the present invention. An elastic supporting means 86*a* of the manufacturing apparatus 21*j* for a ring-shaped member of this example is for elastically supporting a pair of movable annular-shaped members 80*a*, 80*b* in the radial direction in the same way as in the eleventh example of an embodiment, and is provided on the opposite side from the forming roll 24*a* with respect to the center axis of the mandrel 23*c*.

The elastic supporting means 86*a* includes an elastic member 88 and a transmission member 89. The elastic member 88 is constructed by a coil spring or the like and is provided in a state in which one end (the end section on the opposite side from the forming roll 24*a*) thereof is supported by a fixed supporting section 51*c* that is supported by and fastened to a fixed portion such as a housing, and the other end (the end section on the forming roll 24*a* side) thereof is supported by the transmission member 89. The elastic member 88 is not limited to a mechanical type of member, and it is also possible to employ various types of construction such as a hydraulic type, a gas pressure type, a pneumatic type or the like.

The transmission member 89 is provided between the elastic member 88 and the pair of movable annular-shaped members 80*a*, 80*b*, and includes a base section 90, a pair of arm sections 91*a*, 91*b* and a retaining member 92. The base section 90 has a rectangular parallelepiped shape, and is arranged so that the lengthwise direction is a direction that is orthogonal to the center axis of the mandrel. The arm sections 91*a*, 91*b* are formed at two locations of the end section on the forming roll 24*a* side of one side surface (front side surface in FIG. 18) of the base section 90 that are separated in the axial direction of the mandrel 23*c*, and protrude out from the one side surface of the base section 90. The retaining member 92 has a partial cylindrical shape, the inner diameter of which is nearly the same as the outer diameter of the movable annular-shaped members 80*a*, 80*b*.

The axial-direction dimension of the retaining member 92 is larger than the distance in the axial direction of one side surface (top side surface in FIG. 18) in the axial direction of one movable annular-shaped member 80a, and the other side surface (bottom side surface in FIG. 18) in the axial direction of the other movable annular-shaped member 80b. The retaining member 92, in a state in which the outer-circumferential surface thereof is supported by and fastened to the pair of arm sections 91a, 91b, is made to come in contact with portions of the outer-circumferential surfaces of the pair of movable annular-shaped members 80a, 80b on the opposite side from the forming roll 24a.

The elastic supporting means 86a, in a state before the start of processing (see FIG. 17A), does not press the pair of movable annular-shaped members 80a, 80b in the radial direction toward the forming roll 24a (does not apply an elastic force). When a pressing force having a specified size is applied to the movable annular-shaped members 80a, 80b in a direction going away from the forming roll 24a, by the elastic member 88 elastically deforming, the elastic supporting member 86a allows the movable annular-shaped members 80a, 80b to displace in the direction of the pressing force (direction going away from the forming roll 24a). This aspect is the same as in the eleventh example of an embodiment. The other construction and functional effects are the same as in the eleventh example of an embodiment.

Thirteenth Example

Figure 20:
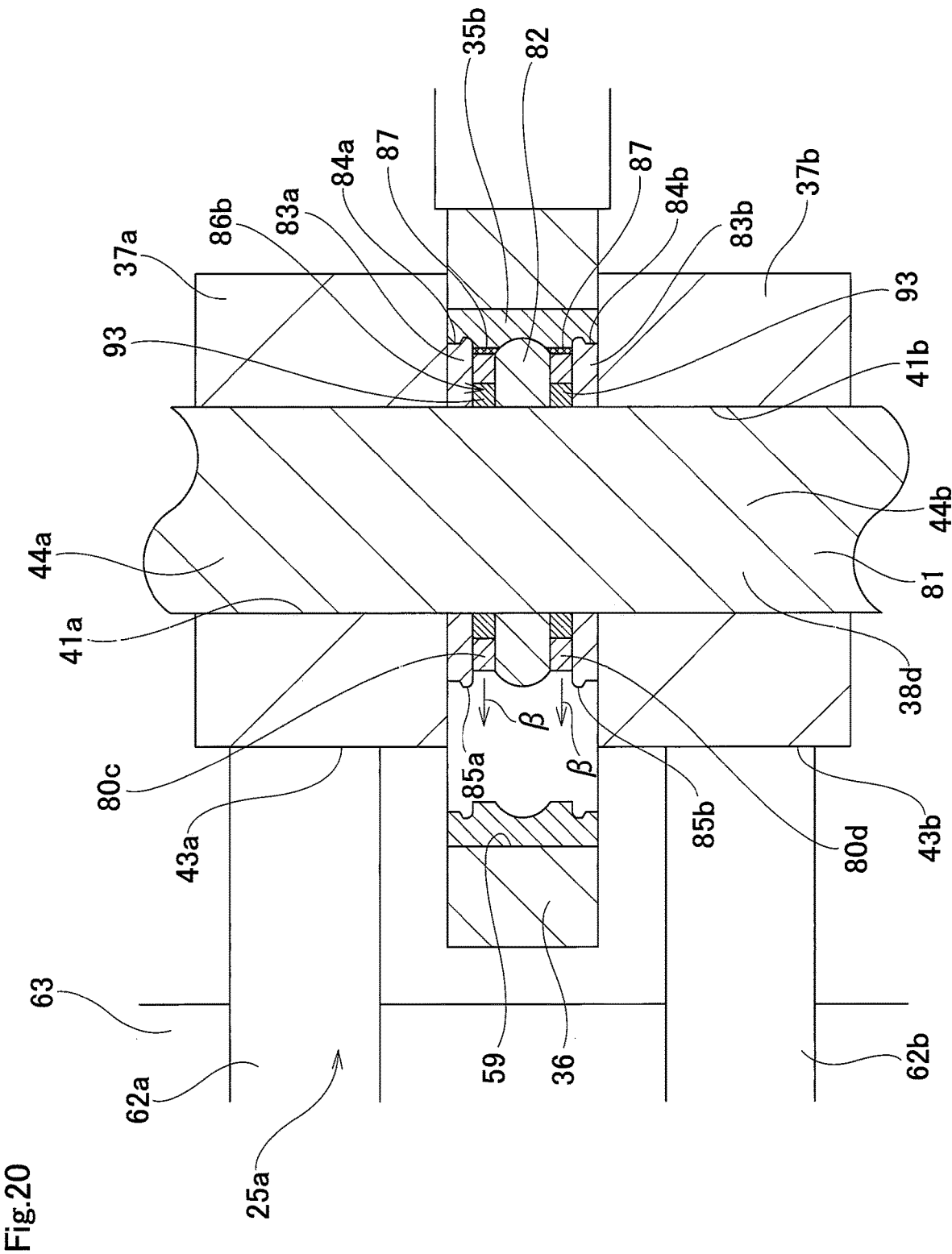
FIG. 20 is similar to FIG. 16, and illustrates a thirteenth example of an embodiment of the present invention.

FIG. 20 illustrates a thirteenth example of an embodiment of the present invention. The manufacturing apparatus for a ring-shaped member of this example is such that the outer-diameter dimension of the movable annular-shaped members 80c, 80d is less than the outer-diameter dimension of the raceway forming member 82 and the pair of locking groove forming members 83a, 83b. The movable annular-shaped members 80c, 80d are concentrically arranged with the mandrel 23d, the raceway forming member 82 and the pair of locking groove forming members 83a, 83b. The arrangement of the movable annular-shaped members 80c, 80d in the axial direction is the same as in the eleventh example and twelfth example of an embodiment.

Annular-shaped elastic members 93 of elastic supporting means 86b are provided between the inner-circumferential surfaces of the movable annular-shaped members 80c, 80d and the outer-circumferential surface of a fixed shaft section 81. The elastic members 93 can be made of material such as urethane rubber, nitrile rubber (NBR), fluororubber and the like that has elasticity. Such elastic members 93 are appropriately determined taking into consideration heat resistance and chemical resistance to lubricating oil that is supplied to the work during processing, heat resistance to heating during processing, and mechanical strength for loads that are applied during processing. Urethane rubber has excellent heat resistance and oil resistance, and fluororubber has excellent oil resistance and chemical resistance. Nitrile rubber (NBR) is inexpensive and has excellent oil resistance and chemical resistance.

By providing elastic members 93, the pair of movable annular-shaped member 80c, 80d are elastically supported in the radial direction. The elastic members 93 elastically deform (contract) when a pressing force having a specified size is applied to the movable annular-shaped members 80c, 80d in a direction going away from the forming roll 24a, which allows the movable annular-shaped members 80c, 80d to displace in the direction of the pressing force (direction going away from the forming roll 24a).

During processing of the metal blank 26, the metal blank 26 plastically deforms so that the outer diameter increases until the outer-circumferential surface of the metal blank 26 comes in contact around the entire circumference of the inner-circumferential surface of an outer-diameter constraining die 36, the molding space then becomes filled with the metal blank 26. At this point in time, the inner-circumferential surface of the metal blank 26 comes in contact with the outer-circumferential surface of the movable annular-shaped members 80c, 80d.

As the forming roll 24a is displaced (pressed) toward the outer-diameter constraining die 36 from this state, the internal stress inside the metal blank 26 increases and presses the mandrel 23c, outer-diameter constraining die 36, movable annular-shaped members 80c, 80d and support shaft sections 37a, 37b that form the molding space. Then, of the pressing forces from the metal blank 26, when the pressing forces that are applied to the outer-circumferential surfaces of the movable annular-shaped members 80c, 80d in a direction going away from the forming roll 24a exceed a specified value, the movable annular-shaped members 80c, 80d displace in a direction going away from the forming roll 24a (direction indicated by the arrow β in FIG. 20) while causing the elastic members 93 to contract. As a result, the excess material of the metal blank 26 can be released into a portion n expanded (portion indicated by the diagonal lattice in FIG. 20) of the molding space that expanded due to the displacement of the movable annular-shaped members 80c, 80d. The other construction and functional effects are the same as in the first example of an embodiment.

Ring-shaped members such as an inner ring or outer ring that are the object of the manufacturing method and manufacturing apparatus of the present invention include not only ring-shaped members for which a finishing process such as a cutting process or grinding process must be performed, but also include ring-shaped members for which a finishing process is not necessary. Moreover, as long as there is no contradiction, the construction of each of the examples of an embodiment can also be appropriately combined.

EXPLANATION OF REFERENCE NUMBERS

1 Radial ball bearing
2 Outer ring
3 Inner ring
4 Ball
5 Outer-ring raceway
6 Inner-ring raceway
7 Cage
8 Billet
9 Small-diameter section
10 Large-diameter section
11 First intermediate blank
12 Second cylindrical section
13 Second intermediate blank
14 First cylindrical section
15 Third intermediate blank
16 Bottom section
17 Fourth intermediate blank
18 Small-diameter cylindrical member
19 Inward-facing flange section
20 Large-diameter cylindrical member
21, 21a to 21j Manufacturing apparatus for a ring-shaped member
22 Ring-shaped member
23, 23a to 23c Mandrel
24, 24a Forming roll 25, 25a Support roll
26 Metal blank
27 First rolling surface
28 Mandrel-side regulating surface
29 Cradle
30 Second rolling surface
31 Forming-roll side regulating surface
32 Roll
33 Synchronizing mechanism
34 Electric motor
35 Ring-shaped member
36, 36a, 36b Outer-diameter constraining die
37a to 37e Support shaft section
38, 38a to 38c Rolling shaft section
39a to 39e Center hole
40a, 40b Threaded hole
41a to 41c Fitting hole
42a, 42b Small-diameter cylindrical section
43a, 43b Mandrel side regulating surface
44a to 44d Fitting section
45 Rolling surface section
46, 46a First rolling surface
47, 47a Raceway forming section
48 Cylindrical surface section
49 Groove forming section
50a, 50b Radial tapered roller bearing
51a, 51b, 51c Fixed shaft section
52a to 52d Displaceable support section
53a, 53b Stepped section
54a, 54b Constraining member
55a, 55b Through hole
56a, 56b Bolt
57 Fixed portion
58, 58a Elastic member
59, 59a Second rolling surface
60 Roller
61 Rotating shaft
62a, 62b Roller
63 Rotating shaft
64 Excess material
65a, 65b Male threaded section
66a, 66b Constraining member
67a, 67b, 67c Connecting shaft section
68 Feed screw mechanism
69 Servo motor
70 Reducer
71 Ball screw
72 Nut
73 Through hole
74a, 74b Outer-diameter constraining die element
75 Outer-circumference holding member
76a, 76b Cylindrical surface section
77a, 77b Curved surface section
78 Axial-direction gap
79 Semi-ring-shaped member
80a to 80d Movable annular-shaped member
81 Fixed shaft member
82 Raceway forming member
83a, 83b Locking groove forming member
84a, 84b Cylindrical surface section
85a, 85b Convex section
86, 86a, 86b Elastic supporting means
87 Expanded portion
88 Elastic member
89 Transmission member
90 Base section
91a, 91b Arm section
92 Retaining member
93 Elastic member

What is claimed is:

1. A manufacturing apparatus for a ring-shaped member comprising:
a mandrel; and
an outer-diameter constraining die;
the manufacturing apparatus used for forming the ring-shaped member by performing a rolling process on an inner-circumferential surface and an outer-circumferential surface of an annular-shaped metal blank;
the mandrel comprising:
a pair of support shaft sections; and
a rolling shaft section;
the mandrel rotatably supported around a center axis of the mandrel,
the pair of support shaft sections having a larger diameter than the rolling shaft section, and provided so as to be separated from each other and concentric with each other in an axial direction of the mandrel; and
the rolling shaft section provided between the pair of support shaft sections so as to be concentric with the pair of support shaft sections, and having a first rolling surface for performing the rolling process on the inner-circumferential surface of the metal blank formed around an outer-circumferential surface of the rolling shaft;
the outer-diameter constraining die having an annular shape;
comprising a center axis, and a second rolling surface for performing the rolling process on the outer-circumferential surface of the metal blank formed around an inner-circumferential surface of the outer-diameter constraining die;
supported in a state in which the center axis of the outer-diameter constraining die is parallel with the center axis of the mandrel rotatably around the center axis of the outer-diameter constraining die; and
arranged so that the rolling shaft section is inserted into an inner-diameter side of the outer-diameter constraining die and the second rolling surface faces the first rolling surface;
wherein at least one support shaft section of the pair of support shaft sections is formed separately from the rolling shaft section, and during processing of the metal blank, and when the at least one support shaft section receives a specified pressing force in the axial direction from the metal blank, the at least one support shaft section is able to displace in the axial direction in a direction going away from the rolling shaft section, allowing a molding space that is defined by the first rolling surface of the mandrel, the second rolling surface of the outer-diameter constraining die, and end surfaces on the rolling shaft section side of the pair of support shaft sections to expand; and
the manufacturing apparatus is capable of forming the ring-shaped member, in which part of a circumferential direction of the metal blank is arranged in the molding space, by rotating the mandrel around the center axis of the mandrel together with rotating the outer-diameter constraining die around the center axis of the outer-diameter constraining die, and pressing the metal blank between the first rolling surface and the second rolling surface so as to perform the rolling process on the inner-circumferential surface and the outer-circumferential surface of the annular-shaped metal blank, wherein
the outer-diameter constraining die comprises a plurality of outer-diameter constraining die elements having an annular shape and arranged side-by-side in the axial direction;
the second rolling surface is constructed by inner-circumferential surfaces of the plurality of outer-diameter constraining die elements;
the outer-diameter constraining die is able to perform the rolling process corner sections that are connecting sections between the outer-circumferential surface and both ends in the axial direction of the metal blank in order to form chamfer sections together with on the outer-circumferential surface of the metal blank; and
the plurality of outer-diameter constraining die elements are able to displace in a direction going away from each other to form an axial-direction gap between the plurality of outer diameter constraining die elements when, during processing of the metal blank, specified pressing forces in the axial direction are received from the metal blank.

2. The manufacturing apparatus for a ring-shaped member according to claim 1, wherein
the outer-diameter constraining die further comprises an annular-shaped outer-circumference restraining member, and the outer-diameter constraining die is constructed by fitting the outer-circumference restraining member around the outer-circumferential surfaces of the plurality of outer-diameter constraining die elements in a state that allows the plurality of outer-diameter constraining die elements to displace in the axial direction.

3. The manufacturing apparatus for a ring-shaped member according to claim 1 further comprising an elastic member elastically pressing the at least one support shaft section in the axial direction in a direction toward the rolling shaft section.

4. A manufacturing method for a ring-shaped member that uses the manufacturing apparatus for the ring-shaped member of claim 1; wherein the excess material release means expands the molding space and allows the excess material of the metal blank to be released by displacing in the axial direction and/or radial direction when, during processing of the metal blank, the specified pressing forces in the axial direction and/or radial direction are received from the metal blank.

5. A manufacturing apparatus for a ring-shaped member comprising:
a mandrel; and
an outer-diameter constraining die;
the manufacturing apparatus used for forming the ring-shaped member by performing a rolling process on an inner-circumferential surface and an outer-circumferential surface of an annular-shaped metal blank;
the mandrel comprising:
a pair of support shaft sections; and
a rolling shaft section;
the mandrel rotatably supported around a center axis of the mandrel,
the pair of support shaft sections having a larger diameter than the rolling shaft section, and provided so as to be separated from each other and concentric with each other in an axial direction of the mandrel; and
the rolling shaft section provided between the pair of support shaft sections so as to be concentric with the pair of support shaft sections, and having a first rolling surface for performing the rolling process on the inner-circumferential surface of the metal blank formed around an outer-circumferential surface of the rolling shaft;
the outer-diameter constraining die having an annular shape;
comprising a center axis, and a second rolling surface for performing the rolling process on the outer-circumferential surface of the metal blank formed around an inner-circumferential surface of the outer-diameter constraining die;
supported in a state in which the center axis of the outer-diameter constraining die is parallel with the center axis of the mandrel rotatably around the center axis of the outer-diameter constraining die; and
arranged so that the rolling shaft section is inserted into an inner-diameter side of the outer-diameter constraining die and the second rolling surface faces the first rolling surface; and
the manufacturing apparatus capable of forming the ring-shaped member, in which part of a circumferential direction of the metal blank is arranged in a molding space that is defined by the first rolling surface of the mandrel, the second rolling surface of the outer-diameter constraining die, and end surfaces on the rolling shaft section side of the pair of support shaft sections, by rotating the mandrel around the center axis of the mandrel together with rotating the outer-diameter constraining die around the center axis of the outer-diameter constraining die, and pressing the metal blank between the first rolling surface and the second rolling surface so as to perform the rolling process on the inner-circumferential surface and the outer-circumferential surface of the annular-shaped metal blank,
wherein
the manufacturing apparatus further comprises a movable annular-shaped member provided in a portion that faces the inner-circumferential surface of the metal blank when using the manufacturing apparatus for the ring-shaped member,
a portion of the rolling shaft section that is separated in the axial direction from a portion where the first rolling surface is formed is inserted into an inner side in the radial direction of the movable annular-shaped member, and the movable annular-shaped member is able to displace in the radial direction to expand the molding space when, during processing of the metal blank, a specified pressing force in the radial direction is received from the metal blank.

6. The manufacturing apparatus for a ring-shaped member according to claim 5 further comprising an elastic member elastically supporting the movable annular-shaped member with respect to the radial direction.

* * * * *